(12) United States Patent
Kosaka

(10) Patent No.: US 11,780,529 B2
(45) Date of Patent: Oct. 10, 2023

(54) OPERATING DEVICE FOR HUMAN-POWERED VEHICLE

(71) Applicant: SHIMANO INC., Sakai (JP)

(72) Inventor: Kentaro Kosaka, Sakai (JP)

(73) Assignee: SHIMANO INC., Sakai (JP)

( * ) Notice: Subject to any disclaimer, the term of this patent is extended or adjusted under 35 U.S.C. 154(b) by 40 days.

(21) Appl. No.: 17/473,984

(22) Filed: Sep. 13, 2021

(65) Prior Publication Data

US 2023/0080156 A1 Mar. 16, 2023

(51) Int. Cl.
*B62K 23/06* (2006.01)
*B62M 25/08* (2006.01)

(52) U.S. Cl.
CPC ............ *B62K 23/06* (2013.01); *B62M 25/08* (2013.01)

(58) Field of Classification Search
CPC .............................. B62K 23/02; B62M 25/08
See application file for complete search history.

(56) References Cited

U.S. PATENT DOCUMENTS

| 9,079,629 | B2 * | 7/2015 | Kosaka | B62M 25/08 |
| 9,145,183 | B2 * | 9/2015 | Kosaka | B62K 23/06 |
| 9,326,412 | B2 * | 4/2016 | Kosaka | H05K 7/14 |
| 2006/0053940 | A1 | 3/2006 | McLaughlin et al. | |
| 2015/0096406 | A1 * | 4/2015 | Miki | B62K 21/12 74/494 |
| 2019/0100281 | A1 * | 4/2019 | Kawakami | G05G 1/04 |

FOREIGN PATENT DOCUMENTS

EP 1623918 B2 2/2006

* cited by examiner

*Primary Examiner* — Charles A Fox
*Assistant Examiner* — Gregory T Prather
(74) *Attorney, Agent, or Firm* — MORI & WARD, LLP

(57) ABSTRACT

An operating device for a human-powered vehicle comprises a base structure, a first switch unit, and a second switch unit. The base structure defines a mounting axis. The first switch unit comprises a first switch base member, a first switch, and a first point. The first point is closest to the mounting axis along a first direction parallel to a first pivot axis. The second switch unit comprises a second switch base member, a second switch, and a second point. The second point is closest to the mounting axis along a second direction parallel to a second pivot axis. A second minimum distance is longer than a first minimum distance. A third minimum distance is longer than a fourth minimum distance.

20 Claims, 18 Drawing Sheets

OPERATING DEVICE FOR HUMAN-POWERED VEHICLE

BACKGROUND

Technical Field

The present invention relates to an operating device for a human-powered vehicle.

Background Information

A human-powered vehicle includes an operating unit configured to operate an operated unit. The operating unit includes a switch configured to receive a user input. The operating unit further includes an additional switch configured to receive an additional user input. To improve user-friendliness of the operating unit, it is preferable that a switch unit and an additional switch unit are efficiently arranged around a tubular part of the human-powered vehicle.

SUMMARY

In accordance with a first aspect of the present invention, an operating device for a human-powered vehicle comprises a base structure, a first switch unit, and a second switch unit. The base structure defines a mounting axis and is configured to be mounted to a tubular part of the human-powered vehicle. The first switch unit comprises a first switch base member, a first switch, and a first point. The first switch base member is configured to be coupled to the base structure. The first switch is mounted to the first switch base member. The first point is closest to the mounting axis along a first direction parallel to the first pivot axis. The second switch unit comprises a second switch base member, a second switch, and a second point. The second switch base member is configured to be coupled to the base structure. The second switch is mounted to the second switch base member. The second point is closest to the mounting axis along a second direction parallel to the second pivot axis. A first minimum distance is defined between the first pivot axis and the mounting axis as viewed along the mounting axis. A second minimum distance is defined between the second pivot axis and the mounting axis as viewed along the mounting axis. The second minimum distance is longer than the first minimum distance. A third minimum distance is defined between a first reference plane and the mounting axis as viewed along the mounting axis. The first reference plane is perpendicular to the first pivot axis and includes the first point. A fourth minimum distance is defined between a second reference plane and the mounting axis as viewed along the mounting axis. The second reference plane is perpendicular to the second pivot axis and includes the second point. The third minimum distance is longer than the fourth minimum distance.

With the operating device according to the first aspect, it is possible to efficiently arrange the first switch unit and the second switch unit around the tubular part of the human-powered vehicle by satisfying the relationship between the first minimum distance and the second minimum distance and the relationship between the third minimum distance and the fourth minimum distance.

In accordance with a second aspect of the present invention, the operating device according to the first aspect is configured so that the second pivot axis extends along the first pivot axis as viewed along the mounting axis.

With the operating device according to the second aspect, it is possible to arrange the first switch unit and the second switch unit in such a manner that an orientation of the first switch unit is identical or similar to an orientation of the second switch unit. Thus, it is possible to more efficiently arrange the first switch unit and the second switch unit around the tubular part of the human-powered vehicle.

In accordance with a third aspect of the present invention, the operating device according to the first or second aspect is configured so that the second pivot axis is parallel to the first pivot axis as viewed along the mounting axis.

With the operating device according to the third aspect, it is possible to arrange the first switch unit and the second switch unit in such a manner that an orientation of the first switch unit is identical to an orientation of the second switch unit. Thus, it is possible to more efficiently arrange the first switch unit and the second switch unit around the tubular part of the human-powered vehicle.

In accordance with a fourth aspect of the present invention, the operating device according to any one of the first to third aspects further comprises a first coupling structure and a second coupling structure. The first coupling structure is configured to couple the first switch base member to the base structure such that the position of the first switch base member is adjustable relative to the base structure about the first pivot axis. The second coupling structure is configured to couple the second switch base member to the base structure such that the position of the second switch base member is adjustable relative to the base structure about the second pivot axis.

With the operating device according to the fourth aspect, it is possible to adjust a position of the first switch unit and/or a position of the second switch unit depending on the user's preference.

In accordance with a fifth aspect of the present invention, the operating device according to any one of the first to fourth aspects is configured so that the first switch unit has a first width and a first center plane. The first width is defined along the first pivot axis. The first center plane is defined to bisect the first width and is perpendicular to the first pivot axis. The second switch unit has a second width and a second center plane. The second width is defined along the second pivot axis. The second center plane is defined to bisect the second width and is perpendicular to the second pivot axis. The second center plane is offset from the first center plane.

With the operating device according to the fifth aspect, the positional relationship between the first center plane and the second center plane can provide a space through which the user can access the first switch unit and the second switch unit. Thus, it is possible to improve user-friendliness of the first switch unit and the second switch unit.

In accordance with a sixth aspect of the present invention, the operating device according to the fifth aspect is configured so that the second center plane is provided between the first center plane and the mounting axis.

With the operating device according to the sixth aspect, it is possible to reliably improve user-friendliness of the first switch unit and the second switch unit.

In accordance with a seventh aspect of the present invention, the operating device according to any one of the first to sixth aspects is configured so that the second pivot axis is offset from the first pivot axis in a mounting axis direction parallel to the mounting axis.

With the operating device according to the seventh aspect, the positional relationship between the first pivot axis and the second pivot axis can provide a space through which the user can access the first switch unit and the second switch unit. Thus, it is possible to improve user-friendliness of the first switch unit and the second switch unit.

In accordance with an eighth aspect of the present invention, the operating device according to the seventh aspect is configured so that the base structure includes a mounting opening through which the tubular part is to extend in a mounting state where the base structure is mounted to the tubular part. The first pivot axis is closer to the mounting opening than the second pivot axis in the mounting axis direction.

With the operating device according to the eighth aspect, the positional relationship between the first pivot axis, the second pivot axis, and the mounting opening can reliably provide a space through which the user can access the first switch unit and the second switch unit. Thus, it is possible to reliably improve user-friendliness of the first switch unit and the second switch unit.

In accordance with a ninth aspect of the present invention, the operating device according to any one of the first to eighth aspects is configured so that the first pivot axis is non-parallel to the mounting axis. The second pivot axis is non-parallel to the mounting axis.

With the operating device according to the ninth aspect, it is possible to improve flexibility of arrangement of the first switch unit and the second switch unit in comparison with a case where at least one of the first pivot axis and the second pivot axis is parallel to the mounting axis.

In accordance with a tenth aspect of the present invention, the operating device according to the ninth aspect is configured so that the first pivot axis extends along a reference plane perpendicular to the mounting axis. The second pivot axis extends along the reference plane.

With the operating device according to the tenth aspect, it is possible to reliably improve flexibility of arrangement of the first switch unit and the second switch unit.

In accordance with an eleventh aspect of the present invention, the operating device according to any one of the first to tenth aspects is configured so that the second switch base member has a shape identical to a shape of the first switch base member.

With the operating device according to the eleventh aspect, it is possible to reduce manufacturing costs of the operating device.

In accordance with a twelfth aspect of the present invention, the operating device according to any one of the first to eleventh aspects is configured so that the second switch has a shape identical to a shape of the first switch.

With the operating device according to the twelfth aspect, it is possible to reduce manufacturing costs of the operating device.

In accordance with a thirteenth aspect of the present invention, the operating device according to any one of the first to twelfth aspects is configured so that the second switch unit has a shape identical to a shape of the first switch unit.

With the operating device according to the thirteenth aspect, it is possible to reduce manufacturing costs of the operating device.

In accordance with a fourteenth aspect of the present invention, the operating device according to any one of the first to thirteenth aspects is configured so that the first coupling structure is configured to couple the first switch base member to the base structure such that the position of the first switch base member is stepwisely adjustable relative to the base structure about the first pivot axis.

With the operating device according to the fourteenth aspect, it is possible to reliably improve user-friendliness of the first switch unit.

In accordance with a fifteenth aspect of the present invention, the operating device according to any one of the first to fourteenth aspects is configured so that the second coupling structure is configured to couple the second switch base member to the base structure such that the position of the second switch base member is stepwisely adjustable relative to the base structure about the second pivot axis.

With the operating device according to the fifteenth aspect, it is possible to reliably improve user-friendliness of the second switch unit.

In accordance with a sixteenth aspect of the present invention, the operating device according to any one of the first to fifteenth aspects is configured so that the first switch unit includes a first movable member. The first movable member is pivotally coupled to the first switch base member about the first pivot axis, the first movable member being pivotable relative to the first switch base member about the first pivot axis in response to the first user input.

With the operating device according to the sixteenth aspect, it is possible to protect the first switch.

In accordance with a seventeenth aspect of the present invention, the operating device according to any one of the first to sixteenth aspects is configured so that the second switch unit includes a second movable member. The second movable member is pivotally coupled to the second switch base member about the second pivot axis. The second movable member is pivotable relative to the second switch base member about the second pivot axis in response to the second user input.

With the operating device according to the seventeenth aspect, it is possible to protect the first switch.

In accordance with an eighteenth aspect of the present invention, the operating device according to any one of the first to seventeenth aspects further comprises a third switch unit configured to be activated in response to a third user input. The third switch unit is mounted to the base structure in a position different from a position of the first switch unit and a position of the second switch unit.

With the operating device according to the eighteenth aspect, it is possible to increase a total number of operated devices that are operated using the first switch unit, the second switch unit, and the third switch unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
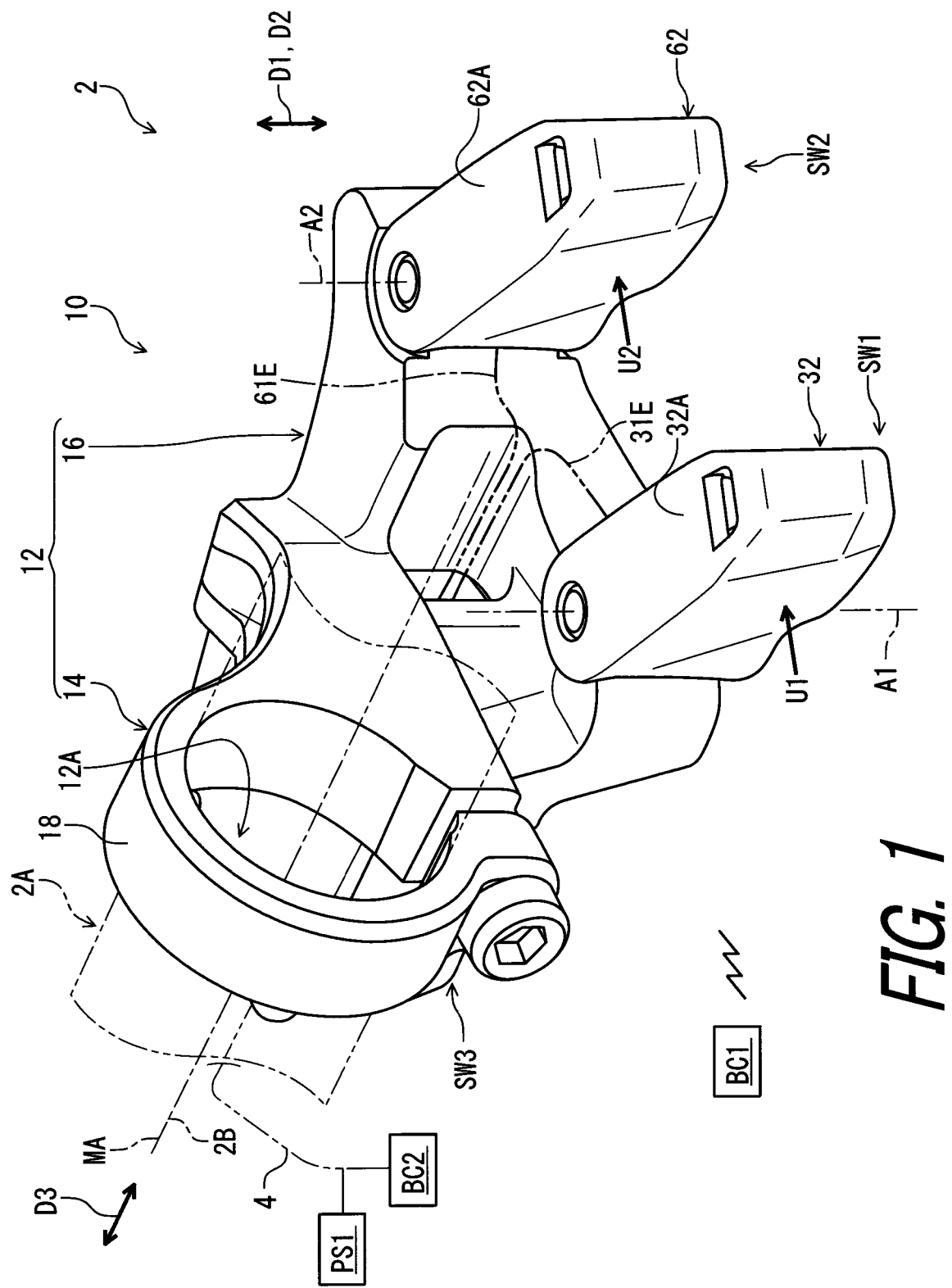
FIG. 1 is a partial perspective view of a human-powered vehicle including an operating device in accordance with an embodiment.

The embodiment(s) will now be described with reference to the accompanying drawings, wherein like reference numerals designate corresponding or identical elements throughout the various drawings.

As seen in FIG. 1, a human-powered vehicle 2 includes an operating device 10 in accordance with an embodiment. The human-powered vehicle 2 includes an electric device BC1, an electric device BC2, and a tubular part 2A. The operating device 10 is configured to be mounted to the tubular part 2A of the human-powered vehicle 2. In the present embodiment, the tubular part 2A includes a handlebar. However, the tubular part 2A can include other parts of the human-powered vehicle 2.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

The operating device 10 is configured to be electrically connected to an electric device BC1. In the present embodiment, the operating device 10 is configured to be connected to the electric device BC1 via a wireless communication channel. The operating device 10 is configured to be wirelessly connected to the electric device BC1.

The operating device 10 is configured to be electrically connected to an electric device BC2. In the present embodiment, the operating device 10 is configured to be connected to the electric device BC2 via a wired communication channel. The operating device 10 is configured to be connected to the electric device BC2 via an electric cable 4.

Examples of the electric devices BC1 and BC2 include an additional or satellite operating device, an adjustable seatpost, a suspension, a gear changing device, a brake device, a lighting device, a display device, a cycle computer, a smartphone, a tablet computer, and a personal computer. In the present embodiment, the electric device BC1 includes a gear changing device such as a derailleur. The electric device BC2 includes a satellite operating device. However, the electric devices BC1 and BC2 are not limited to the above devices.

In the present embodiment, the operating device 10 is a right-hand side operating/control device configured to be operated by the rider's right hand to actuate the electric device BC1 or other devices. However, the structures of the operating device 10 can be applied to a left-hand side operating device.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the operating device 10, should be interpreted relative to the human-powered vehicle 2 equipped with the operating device 10 as used in an upright riding position on a horizontal surface.

As seen in FIG. 1, the operating device 10 for the human-powered vehicle 2 comprises a base structure 12. The base structure 12 is configured to be mounted to the human-powered vehicle 2. The base structure 12 is configured to be mounted to the tubular part 2A of the human-powered vehicle 2.

The base structure 12 defines a mounting axis MA. In the present embodiment, the base structure 12 includes a mounting opening 12A through which the tubular part 2A is to extend in a mounting state where the base structure 12 is mounted to the tubular part 2A. The mounting opening 12A has the mounting axis MA. The mounting axis MA extends along a longitudinal center axis 2B of the tubular part 2A in the mounting state. However, the mounting opening 12A can be omitted from the base structure 12 if needed and/or desired.

Figure 17:
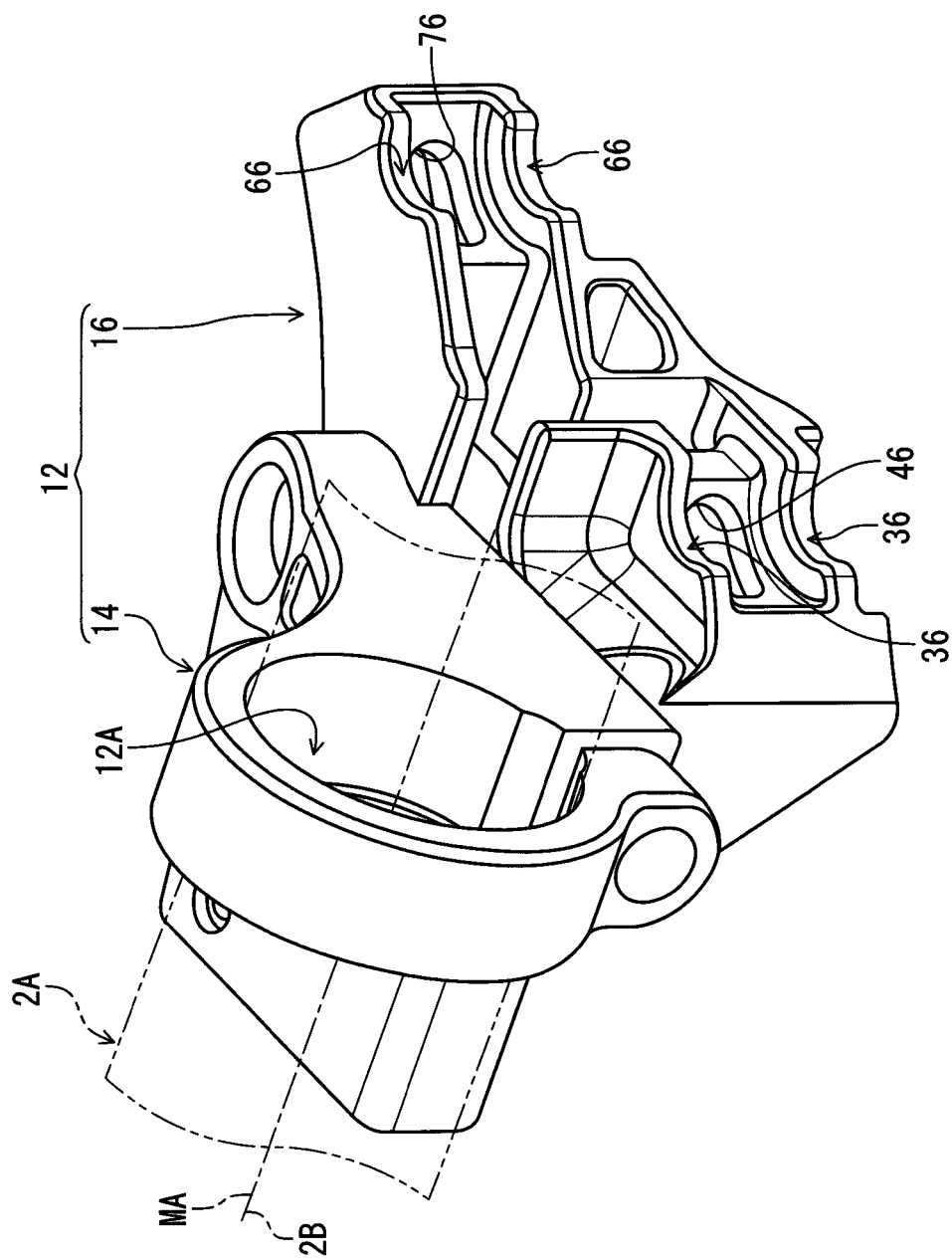
FIG. 17 is a perspective view of a base structure of the operating device illustrated in FIG. 1 (modification).
Figure 18:
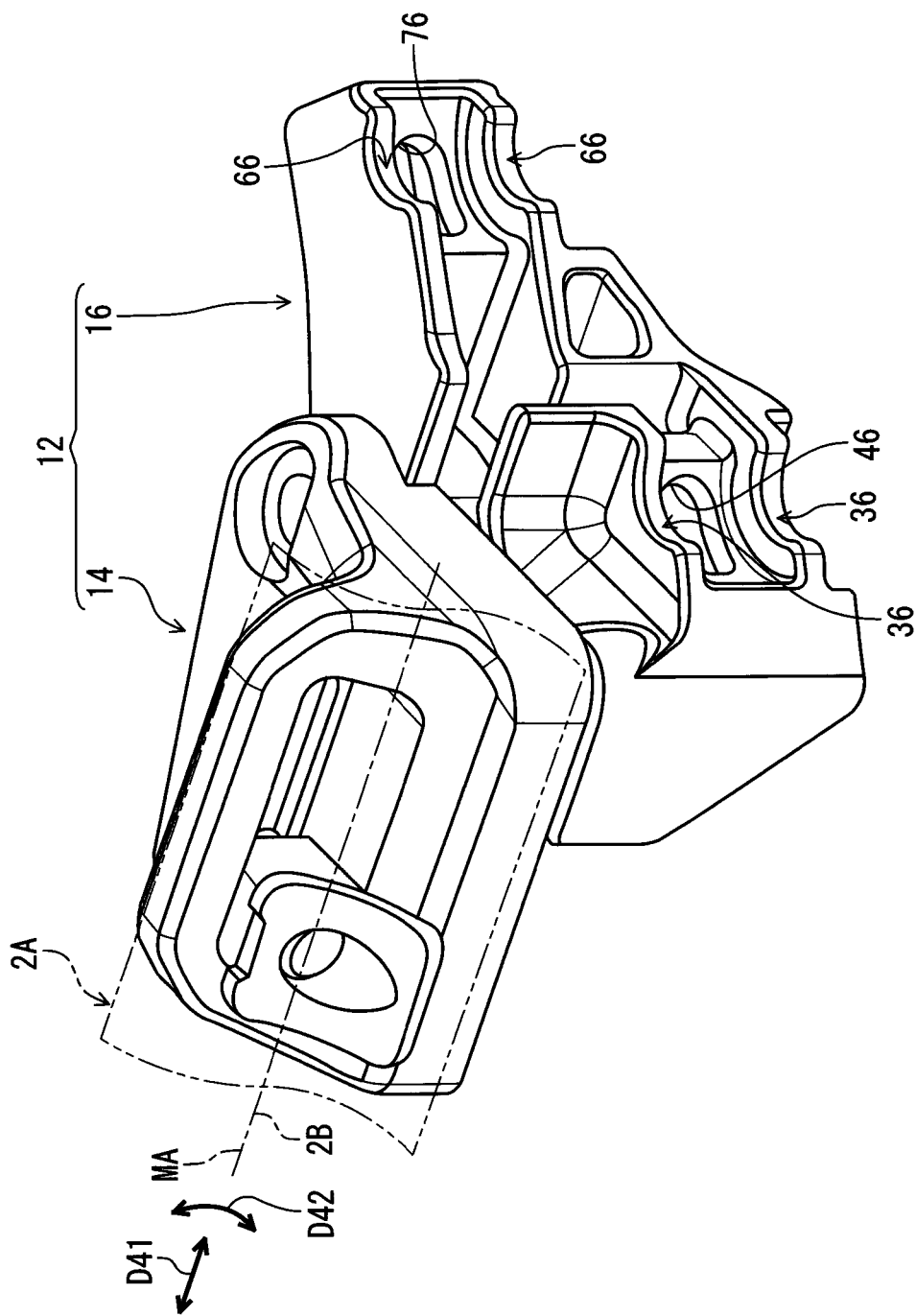
FIG. 18 is a perspective view of a base structure of the operating device illustrated in FIG. 1 (modification).

The base structure 12 includes a mounting body 14 and a base body 16. The mounting body 14 is configured to couple the base body 16 to the tubular part 2A of the human-powered vehicle 2. The mounting body 14 includes the mounting opening 12A. The mounting body 14 includes a clamp 18. The clamp 18 includes the mounting opening 12A and defines the mounting axis MA. In the present embodiment, the mounting body 14 is integrally provided with the base body 16 as a one-piece unitary member. As seen in FIG. 17, however, the mounting body 14 can be a separate member from the base body 16 if needed and/or desired. In FIG. 17, the mounting body 14 is secured to the base body 16 with a fastener such as a screw. Furthermore, the mounting body 14 can include structures other than the clamp 18 if needed and/or desired. For example, the mounting body 14 can be configured to couple the base body 16 to an additional operating device mounted to the tubular part 2A of the human-powered vehicle 2. In such an embodiment, the mounting body 14 is configured to couple the base body 16 to the additional operating device such that a position of the base body 16 is adjustable relative to the tubular part 2A in an axial direction defined along the mounting axis MA and/or in a circumferential direction with respect to the mounting axis MA. For example, the mounting body 14 can have a structure illustrated in FIG. 18. In FIG. 18, the mounting body 14 is secured to the base body 16 with a fastener such as a screw. The mounting body 14 illustrated in FIG. 18 is configured to couple the base body 16 to the additional operating device such that a position of the base body 16 is adjustable relative to the tubular part 2A in an axial direction D41 defined along the mounting axis MA and/or in a circumferential direction D42 with respect to the mounting axis MA. In FIG. 18, the mounting body 14 is a separate member from the base body 16. In FIG. 18, however, the mounting body 14 can be integrally provided with the base body 16 as a one-piece unitary member if needed and/or desired.

The operating device 10 for the human-powered vehicle 2 comprises a first switch unit SW1. The first switch unit SW1 is configured to be activated in response to the first user input U1. The first switch unit SW1 is configured to be coupled to the base structure 12. The first switch unit SW1 is configured to be coupled to the base body 16.

The operating device 10 for the human-powered vehicle 2 comprises a second switch unit SW2. The second switch unit SW2 is configured to be activated in response to the second user input U2. The second switch unit SW2 is configured to be coupled to the base structure 12. The second switch unit SW2 is configured to be coupled to the base body 16.

Figure 2:
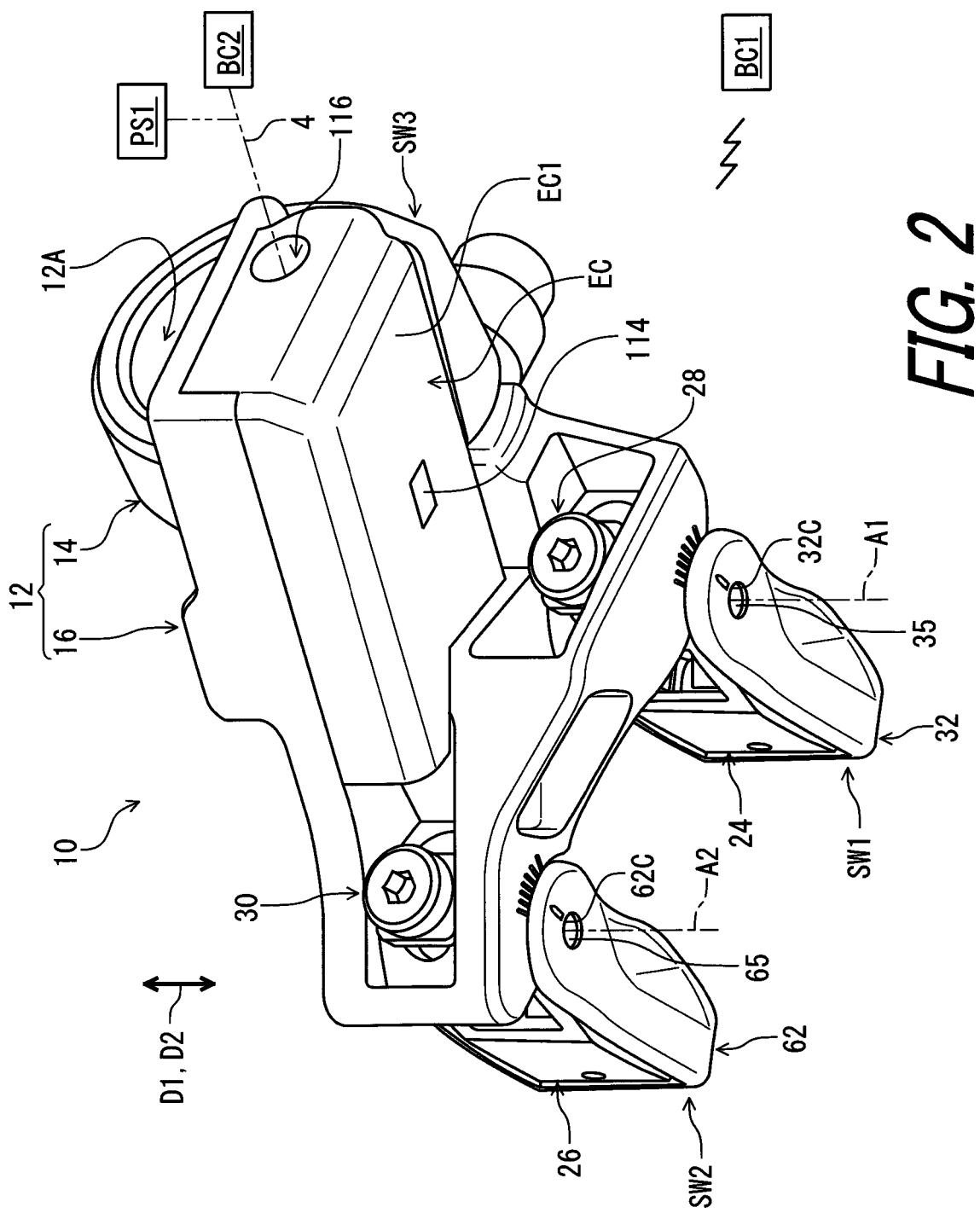
FIG. 2 is a perspective view of the operating device illustrated in FIG. 1.

As seen in FIG. 2, the first switch unit SW1 comprises a first switch base member 24. The first switch base member 24 is configured to be coupled to the base structure 12. The first switch base member 24 is configured to be coupled to the base body 16.

The second switch unit SW2 comprises a second switch base member 26. The second switch base member 26 is configured to be coupled to the base structure 12. The second switch base member 26 is configured to be coupled to the base body 16.

The operating device 10 for the human-powered vehicle 2 comprises a first coupling structure 28. The first coupling structure 28 is configured to couple the first switch unit SW1 to the base structure 12 such that a position of the first switch unit SW1 is adjustable relative to the base structure 12 about a first pivot axis A1. The first coupling structure 28 is configured to couple the first switch base member 24 to the base structure 12 such that the position of the first switch base member 24 is adjustable relative to the base structure 12 about the first pivot axis A1.

The operating device 10 further comprises a second coupling structure 30. The second coupling structure 30 is configured to couple the second switch unit SW2 to the base structure 12 such that a position of the second switch unit SW2 is adjustable relative to the base structure 12 about a second pivot axis A2. The second coupling structure 30 is configured to couple the second switch base member 26 to the base structure 12 such that the position of the second switch base member 26 is adjustable relative to the base structure 12 about the second pivot axis A2.

Figure 3:
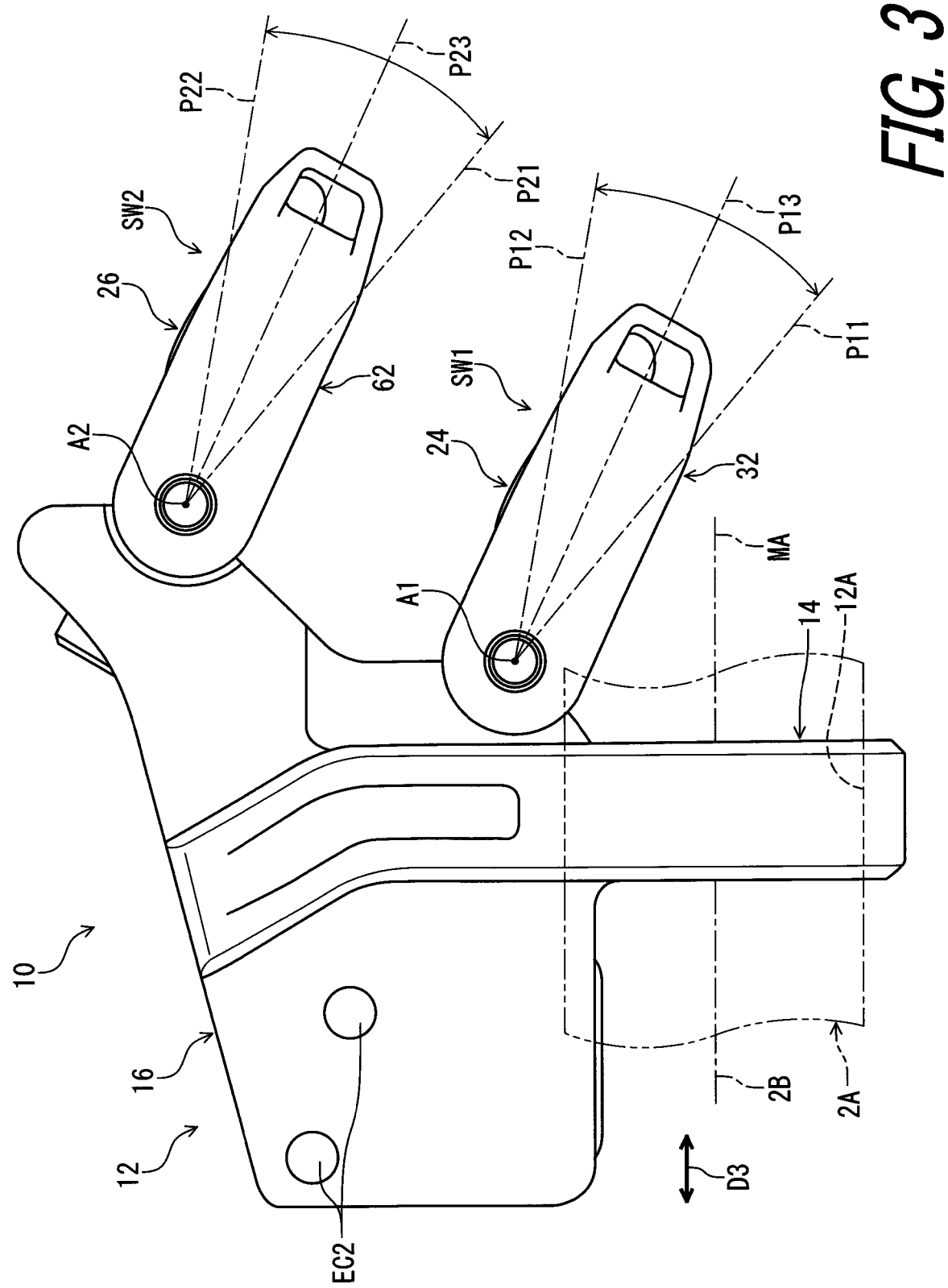
FIG. 3 is a top view of the operating device illustrated in FIG. 1.

As seen in FIG. 3, the first coupling structure 28 is configured to couple the first switch unit SW1 to the base structure 12 such that a position of the first switch unit SW1 is adjustable relative to the base structure 12 about the first pivot axis A1 between a first end position P11 and a first opposite end position P12. The first coupling structure 28 is configured to couple the first switch base member 24 to the base structure 12 such that a position of the first switch base member 24 is adjustable relative to the base structure 12 about the first pivot axis A1 between a first end position P11 and a first opposite end position P12. In FIG. 3, the first switch unit SW1 and the first switch base member 24 are provided in a first middle position P13 between the first end position P11 and the first opposite end position P12 about the first pivot axis A1.

The second coupling structure 30 is configured to couple the second switch unit SW2 to the base structure 12 such that a position of the second switch unit SW2 is adjustable relative to the base structure 12 about the second pivot axis A2 between a second end position P21 and a second opposite end position P22. The second coupling structure 30 is configured to couple the second switch base member 26 to the base structure 12 such that a position of the second switch base member 26 is adjustable relative to the base structure 12 about the second pivot axis A2 between a second end position P21 and a second opposite end position P22. In FIG. 3, the second switch unit SW2 and the second switch base member 26 are provided in a second middle position P23 between the second end position P21 and the second opposite end position P22 about the second pivot axis A2.

Figure 4:
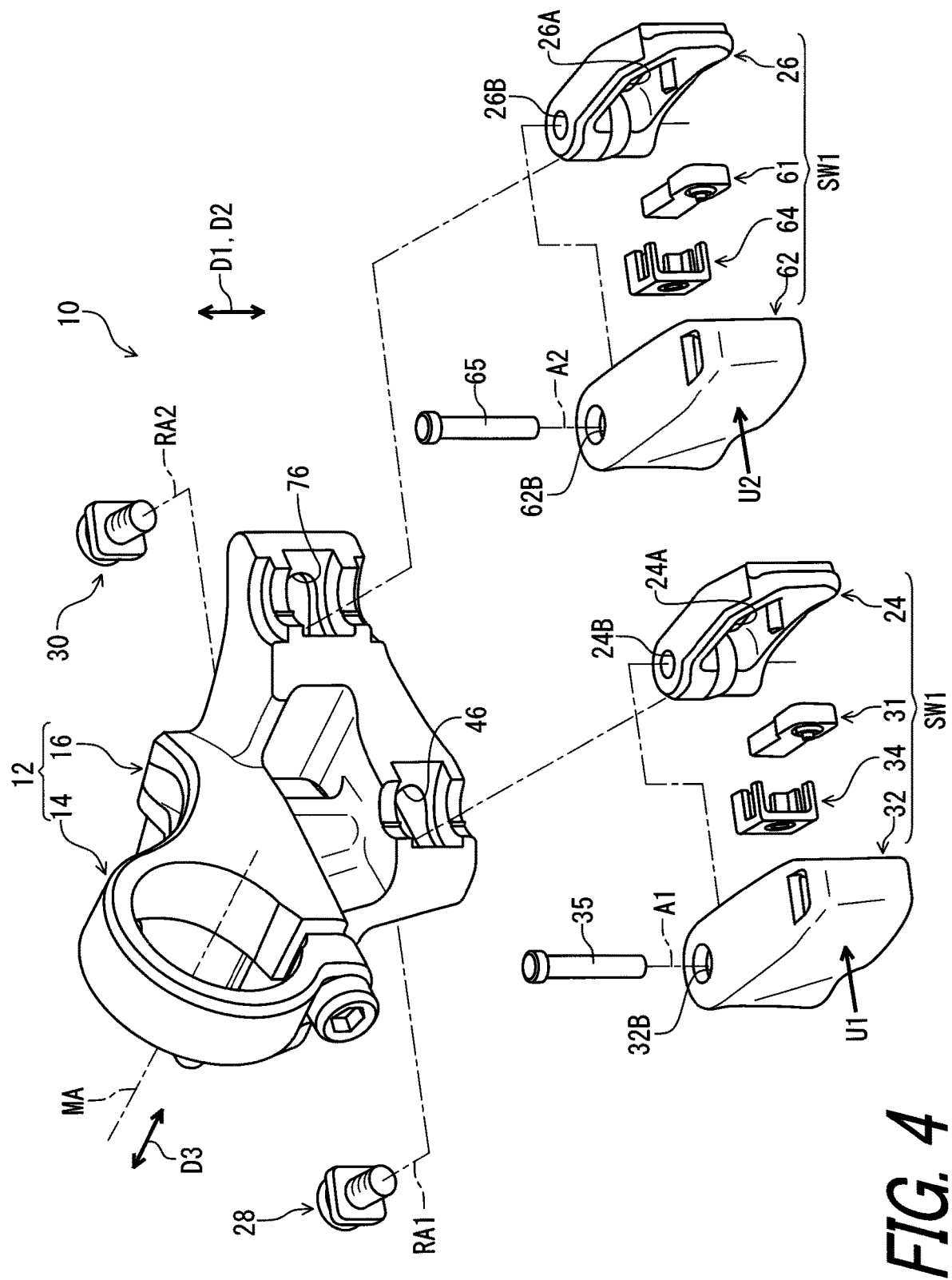
FIG. 4 is an exploded perspective view of the operating device illustrated in FIG. 1.

As seen in FIG. 4, the first switch unit SW1 comprises a first switch 31. The first switch 31 is configured to be activated in response to the first user input U1. The first switch 31 is mounted to the first switch base member 24. The first switch base member 24 includes a first attachment recess 24A. The first switch 31 is provided in the first attachment recess 24A. In the present embodiment, the first switch 31 includes a push-button switch. However, the first switch 31 can include other types of switches.

The first switch unit SW1 comprises a first movable member 32. The first movable member 32 is pivotally coupled to the first switch base member 24 about the first pivot axis A1. The first movable member 32 is pivotable relative to the first switch base member 24 about the first pivot axis A1 in response to the first user input U1. The first movable member 32 is pivotally coupled to the first switch base member 24 about the first pivot axis A1 such that the first movable member 32 activates the first switch 31 in response to the first user input U1.

Figure 5:
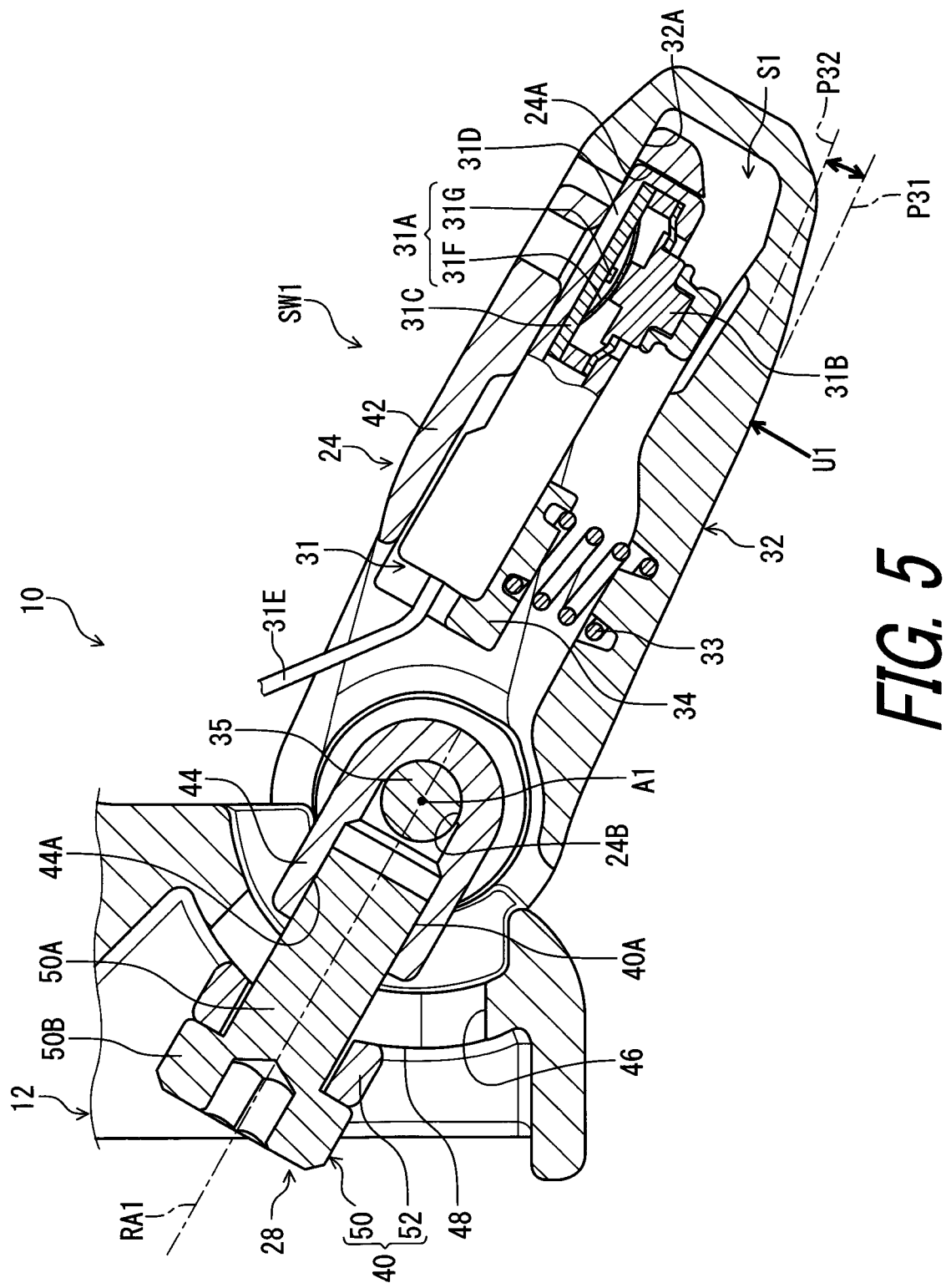
FIG. 5 is a cross-sectional view of a first switch unit of the operating device taken along line V-V of FIG. 14.

As seen in FIG. 5, the first switch 31 includes a switch circuit 31A, a button 31B, a base 31C, a casing 31D, and a wire 31E. The switch circuit 31A and the base 31C are provided in the casing 31D. The switch circuit 31A includes a movable contact 31F and a stationary contact 31G. The stationary contact 31G is provided on the base 31C. The movable contact 31F is elastically deformable and is provided on the base 31C. The movable contact 31F is contactable with the stationary contact 31G. The button 31B is movably attached to the base 31C. The button 31B is configured to transmit the first user input U1 to the movable contact 31F of the switch circuit 31A. The button 31B is movable relative to the base 31C in response to the first user input U1. The movable contact 31F and the stationary contact 31G are electrically connected with the wire 31E.

The movable contact 31F is not in contact with the stationary contact 31G in a state where the button 31B does not receive the first user input U1. The movable contact 31F is elastically deformed to come into contact with the stationary contact 31G when the button 31B transmits the first user input U1 to the movable contact 31F. Thus, the first user input U1 has an amount of force which is necessary to bring the movable contact 31F into contact with the stationary contact 31G to turn on the first switch 31.

The first switch 31 is provided between the first switch base member 24 and the first movable member 32. The first switch base member 24 and the first movable member 32 define a first space S1 between the first switch base member 24 and the first movable member 32. The first switch 31 is provided in the first space S1.

The first movable member 32 is movable relative to the first switch base member 24 about the first pivot axis A1 between a first rest position P31 and a first operated position P32. The first movable member 32 is pivoted about the first pivot axis A1 from the first rest position P31 toward the first operated position P32 in response to the first user input U1.

In the present application, the term "rest position" as used herein refers to a position at which a movable part such as the first movable member 32 remains stationary in a state where the movable part is not operated by the user. The term "operated position" as used herein refers to a position at which the movable part has been operated by the user to perform the operation of the bicycle component.

The first movable member 32 includes a first surface 32A. The first surface 32A is contactable with the first switch base member 24. The first surface 32A is in contact with the first switch base member 24 in a first rest state where the first movable member 32 is in the first rest position P31.

The first switch unit SW1 includes a first biasing member 33 and a first switch support 34. The first switch support 34 is attached to the first switch base member 24 to support the first switch 31. The first switch support 34 is provided in the first attachment recess 24A. The first switch 31 is provided between the first switch support 34 and the first switch base member 24. The first biasing member 33 is provided between the first switch support 34 and the first movable member 32 to bias the first movable member 32 toward the first rest position P31. The first surface 32A is pushed against the first switch base member 24 by a biasing force of the first biasing member 33 in the first rest state where the first movable member 32 is in the first rest position P31.

In the present embodiment, each of the first switch base member 24 and the first movable member 32 is made of a non-metallic material. The first switch base member 24 is made of a resin material such as synthetic resin. The first movable member 32 is made of a resin material such as synthetic resin. However, the first switch base member 24 and the first movable member 32 can be made of material other than the above materials.

The operating device 10 further comprises a first pin 35. The first pin 35 is configured to pivotally couple the first movable member 32 to the first switch base member 24 about the first pivot axis A1. The first pin 35 defines the first pivot axis A1. Thus, the first pin 35 can also be referred to as a first pivot pin 35.

As seen in FIG. 4, the first switch base member 24 includes a first hole 24B. As seen in FIGS. 2 and 4, the first movable member 32 includes first pivot holes 32B and 32C. The first pin 35 extends through the first hole 24B and the first pivot holes 32B and 32C.

Figure 6:
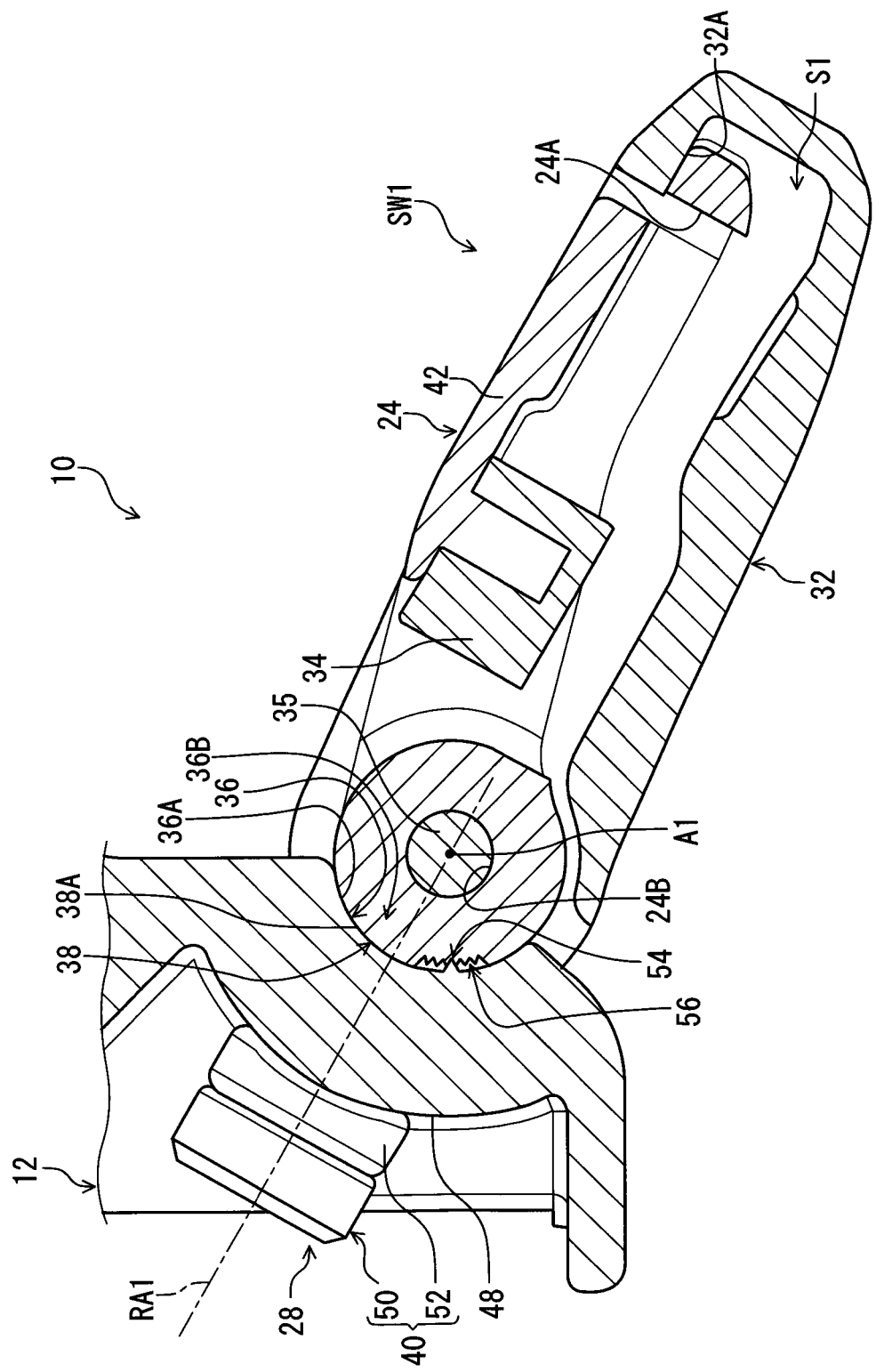
FIG. 6 is a cross-sectional view of the first switch unit of the operating device taken along line VI-VI of FIG. 14.

As seen in FIG. 6, the base structure 12 includes a first base guide surface 36. The first base guide surface 36 is configured to guide the first switch base member 24 relative to the base structure 12 about the first pivot axis A1 in a first adjustable state where the position of the first switch base member 24 is adjustable relative to the base structure 12 about the first pivot axis A1.

The first base guide surface 36 extends circumferentially about the first pivot axis A1. The first base guide surface 36 includes a first concave surface 36A. The first concave surface 36A defines a first recess 36B in which the first switch base member 24 is at least partially provided. In the present embodiment, the first switch base member 24 is partially provided in the first recess 36B. However, the first switch base member 24 can be entirely provided in the first recess 36B if needed and/or desired.

The first switch base member 24 includes a first guide surface 38. The first base guide surface 36 and the first guide surface 38 are configured to contact each other to guide the first switch base member 24 relative to the base structure 12 about the first pivot axis A1 in the first adjustable state. The first guide surface 38 extends circumferentially about the first pivot axis A1.

The first guide surface 38 includes a first convex surface 38A. The first convex surface 38A faces radially outwardly relative to the first pivot axis A1. The first concave surface 36A and the first convex surface 38A are configured to contact each other to guide the first switch base member 24 relative to the base structure 12 about the first pivot axis A1 in the first adjustable state.

As seen in FIG. 5, the first coupling structure 28 includes a first coupling member 40. The first coupling member 40 is configured to couple the first switch base member 24 to the base structure 12 to change a state of the first coupling structure 28 between a first lock state and a first adjustable state. In the first lock state, the first coupling structure 28 fastens the first switch base member 24 to the base structure 12 to restrict the first switch base member 24 from moving relative to the base structure 12. In the first adjustable state, the position of the first switch base member 24 is adjustable relative to the base structure 12 about the first pivot axis A1. For example, the first coupling structure 28 is in the first lock state if the first coupling member 40 is tightened. The first coupling structure 28 is in the first lock state if the first coupling member 40 is loosened.

The first switch base member 24 includes a first base body 42 and a first coupled member 44. The first coupled member 44 has a first threaded hole 44A. The first coupling member 40 includes first external threads 40A. The first external threads 40A are configured to be threadedly engaged with the first threaded hole 44A.

In the present embodiment, the first coupled member 44 is integrally provided with the first base body 42 as a one-piece unitary member. However, the first coupled member 44 can be a separate member from the first base body 42 if needed and/or desired.

The first coupling member 40 is rotatable relative to the first switch base member 24 about a first adjustment rotational axis RA1. The first adjustment rotational axis RA1 intersects with the first pivot axis A1.

The base structure 12 includes a first coupling opening 46. The first coupling member 40 extends through the first coupling opening 46. In the present embodiment, the first coupling opening 46 includes an elongated opening extending circumferentially about the first pivot axis A1. However, the first coupling opening 46 can have other shapes.

The base structure 12 includes a first receiving surface 48. The first coupling member 40 is contactable with the first receiving surface 48 in the first lock state. The first receiving surface 48 extends circumferentially about the first pivot axis A1. The first coupling member 40 includes a first screw 50 and a first washer 52. The first screw 50 includes the first external threads 40A. The first screw 50 includes a first screw body 50A and a first head 50B. The first screw body 50A includes the first external threads 40A. The first head 50B is provided at an end of the first screw body 50A. The first washer 52 is provided between the first head 50B and the first receiving surface 48. The first washer 52 is contactable with the first receiving surface 48. For example, the first coupling structure 28 is in the first lock state if the first screw 50 is tightened. The first coupling structure 28 is in the first lock state if the first screw 50 is loosened.

The first coupling member 40 is configured to pull the first switch base member 24 to fasten the first switch base member 24 to the base structure 12 in the first lock state. However, the first coupling member 40 can be configured to push the first switch base member 24 to fasten the first switch base member 24 to the base structure 12 in the first lock state if needed and/or desired.

As seen in FIG. 6, the first coupling structure 28 is configured to couple the first switch base member 24 to the base structure 12 such that the position of the first switch base member 24 is steplessly or stepwise adjustable relative to the base structure 12 about the first pivot axis A1. In the present embodiment, the first coupling structure 28 is configured to couple the first switch base member 24 to the base structure 12 such that the position of the first switch base member 24 is stepwisely adjustable relative to the base structure 12 about the first pivot axis A1. However, the first coupling structure 28 can be configured to couple the first switch base member 24 to the base structure 12 such that the position of the first switch base member 24 is steplessly adjustable relative to the base structure 12 about the first pivot axis A1 if needed and/or desired.

In the present embodiment, the first coupling structure 28 includes a first engagement part 54 and a first additional engagement part 56. The first engagement part 54 is provided to one of the base structure 12 and the first switch base member 24. The first additional engagement part 56 is provided to the other of the base structure 12 and the first switch base member 24. The first engagement part 54 and the first additional engagement part 56 are configured to engage with each other to position the first switch base member 24 relative to the base structure 12 about the first pivot axis A1 in the first lock state. In the present embodiment, the first engagement part 54 is provided to the base structure 12. The first additional engagement part 56 is provided to the first switch base member 24. However, the first engagement part 54 can be provided to the first switch base member 24 if needed and/or desired. The first additional engagement part 56 can be provided to the base structure 12 if needed and/or desired.

Figure 7:
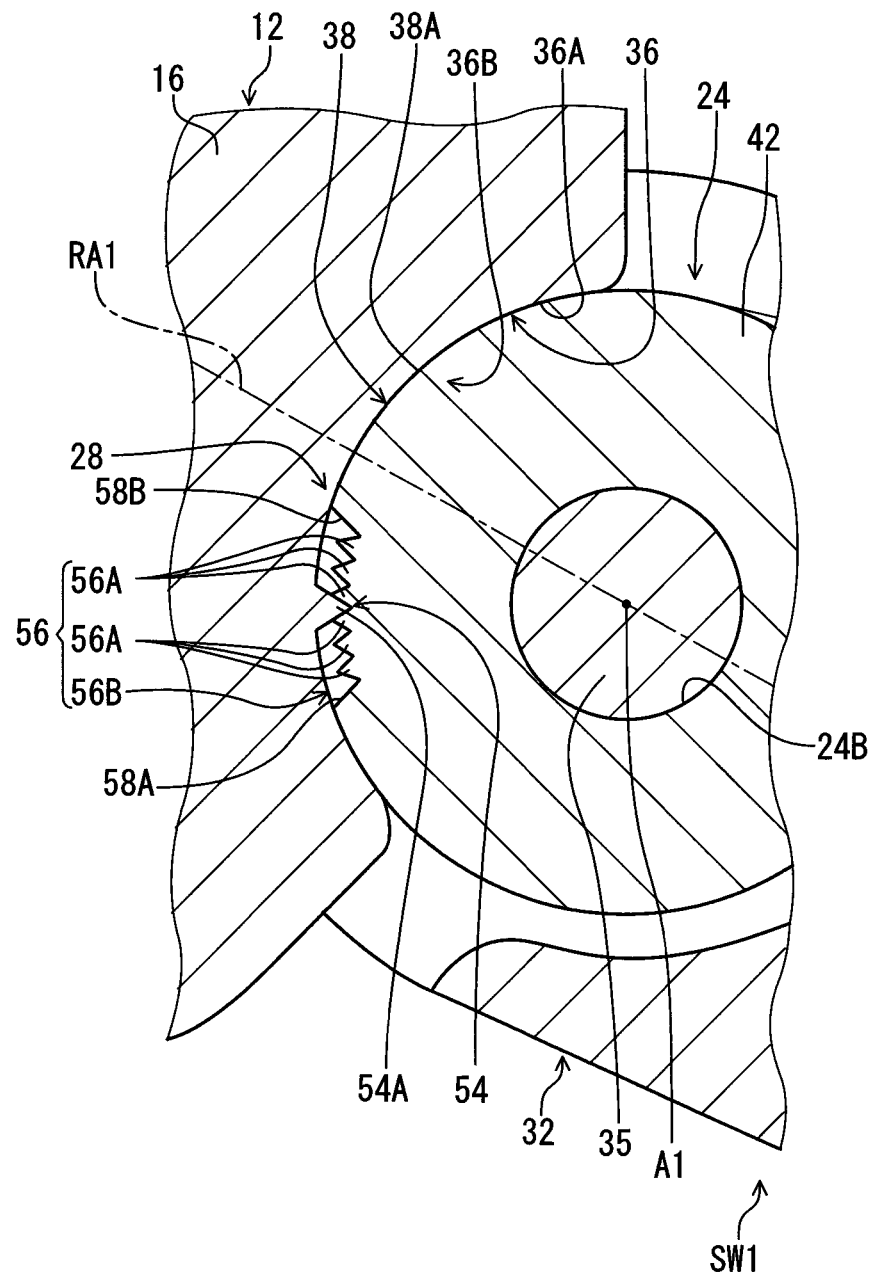
FIG. 7 is an enlarged partial cross-sectional view of the first switch unit of the operating device illustrated in FIG. 6.

As seen in FIG. 7, the first engagement part 54 includes a first projection 54A. The first projection 54A protrudes radially inwardly from the first base guide surface 36 with respect to the first pivot axis A1. The first additional engagement part 56 includes a plurality of first additional projections 56A and a first engagement recess 56B. The first engagement recess 56B is provided on the first guide surface 38. The plurality of first additional projections 56A is provided in the first engagement recess 56B. The first projection 54A is configured to be provided between adjacent two projections of the plurality of first additional projections 56A to position the first switch base member 24 relative to the base structure 12 about the first pivot axis A1 in the first lock state.

A tip of the first additional projection 56A is provided radially inwardly of the first guide surface 38 with respect to the first pivot axis A1. A radial length of the first additional projection 56A is shorter than a radial length of the first projection 54A. Thus, the first projection 54A is movable in the first engagement recess 56B without being fitted between adjacent two of the plurality of first additional projections 56A in the first adjustable state where the first coupling member 40 (e.g., the first screw 50) is loosened.

The structure of the first engagement part 54 is not limited to the above structure. The structure of the first additional engagement part 56 is not limited to the above structure. The first engagement part 54 and the first additional engagement part 56 can be omitted from the first coupling structure 28 if needed and/or desired. In a case where the first engagement part 54 and the first additional engagement part 56 can be omitted from the first coupling structure 28, the first coupling structure 28 is configured to couple the first switch base member 24 to the base structure 12 such that the position of the first switch base member 24 is steplessly adjustable relative to the base structure 12 about the first pivot axis A1.

The first coupling structure 28 includes a first stopper surface 58A and a first opposite stopper surface 58B. The first stopper surface 58A is spaced apart from the first opposite stopper surface 58B. The first stopper surface 58A is contactable with the first projection 54A of the first engagement part 54. The first opposite stopper surface 58B is contactable with the first projection 54A of the first engagement part 54. The plurality of first additional projections 56A of the first additional engagement part 56 is provided between the first stopper surface 58A and the first opposite stopper surface 58B. The first stopper surface 58A and the first opposite stopper surface 58B define the first engagement recess 56B.

The first stopper surface 58A defines the first end position P11 (see e.g., FIG. 3). The first switch unit SW1 and the first switch base member 24 are provided in the first end position P11 (see e.g., FIG. 3) in a state where the first projection 54A of the first engagement part 54 is in contact with the first stopper surface 58A.

The first opposite stopper surface 58B defines the first opposite end position P12 (see e.g., FIG. 3). The first switch unit SW1 and the first switch base member 24 are provided in the first opposite end position P12 (see e.g., FIG. 3) in a state where the first projection 54A of the first engagement part 54 is in contact with the first opposite stopper surface 58B.

Figure 8:
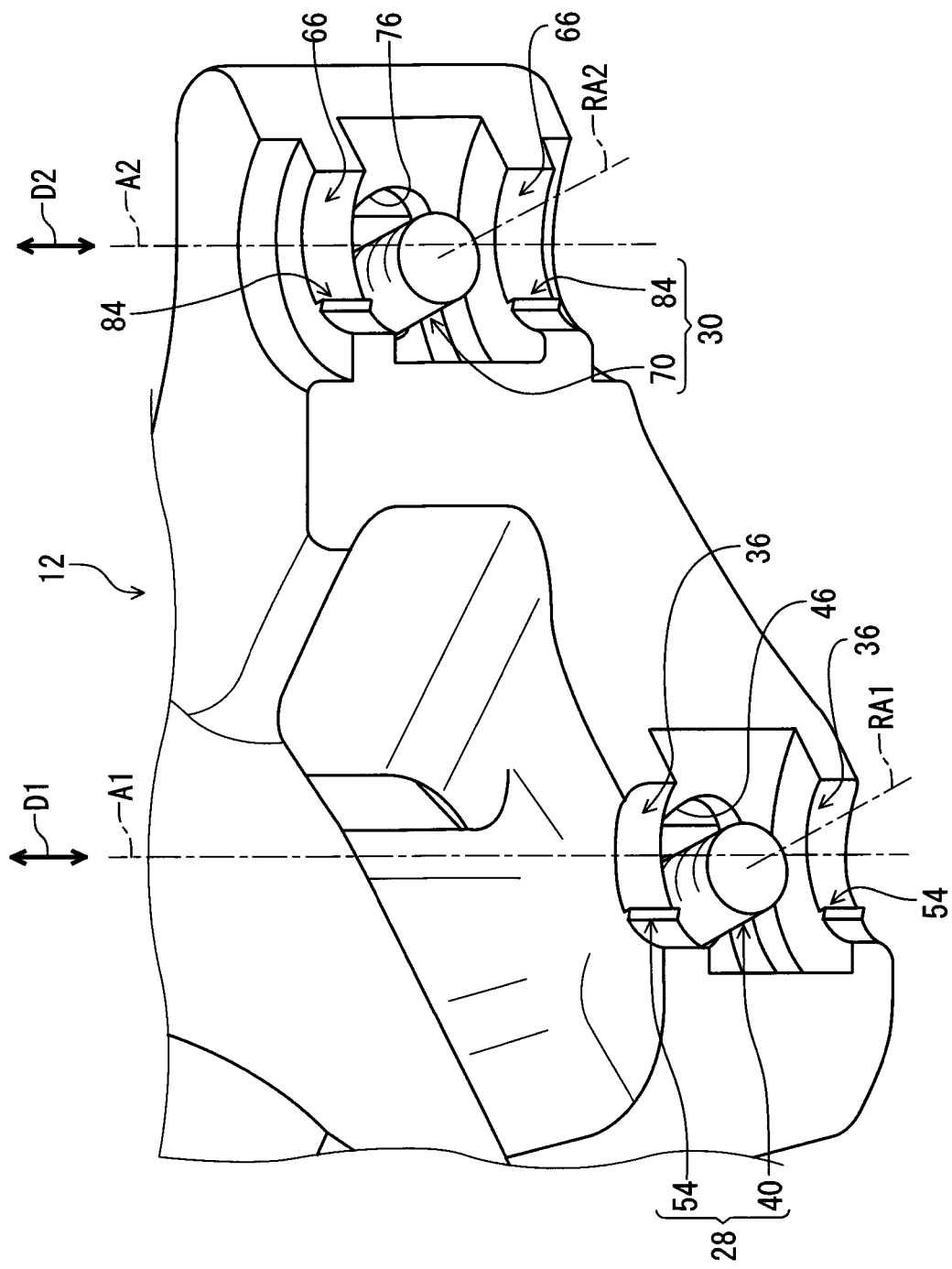
FIG. 8 is a perspective view of the operating device illustrated in FIG. 1 with the first switch unit and a second switch unit omitted.

As seen in FIG. 8, the base structure 12 includes a plurality of first base guide surfaces 36. The first base guide surfaces 36 are spaced from each other in a first direction D1 parallel to the first pivot axis A1. The first coupling structure 28 includes a plurality of first engagement parts 54. The first engagement parts 54 are spaced apart from each other in the first direction D1. A total number of the first base guide surfaces 36 is not limited to the illustrated embodiment. A total number of the first engagement parts 54 is not limited to the illustrated embodiment.

Figure 9:
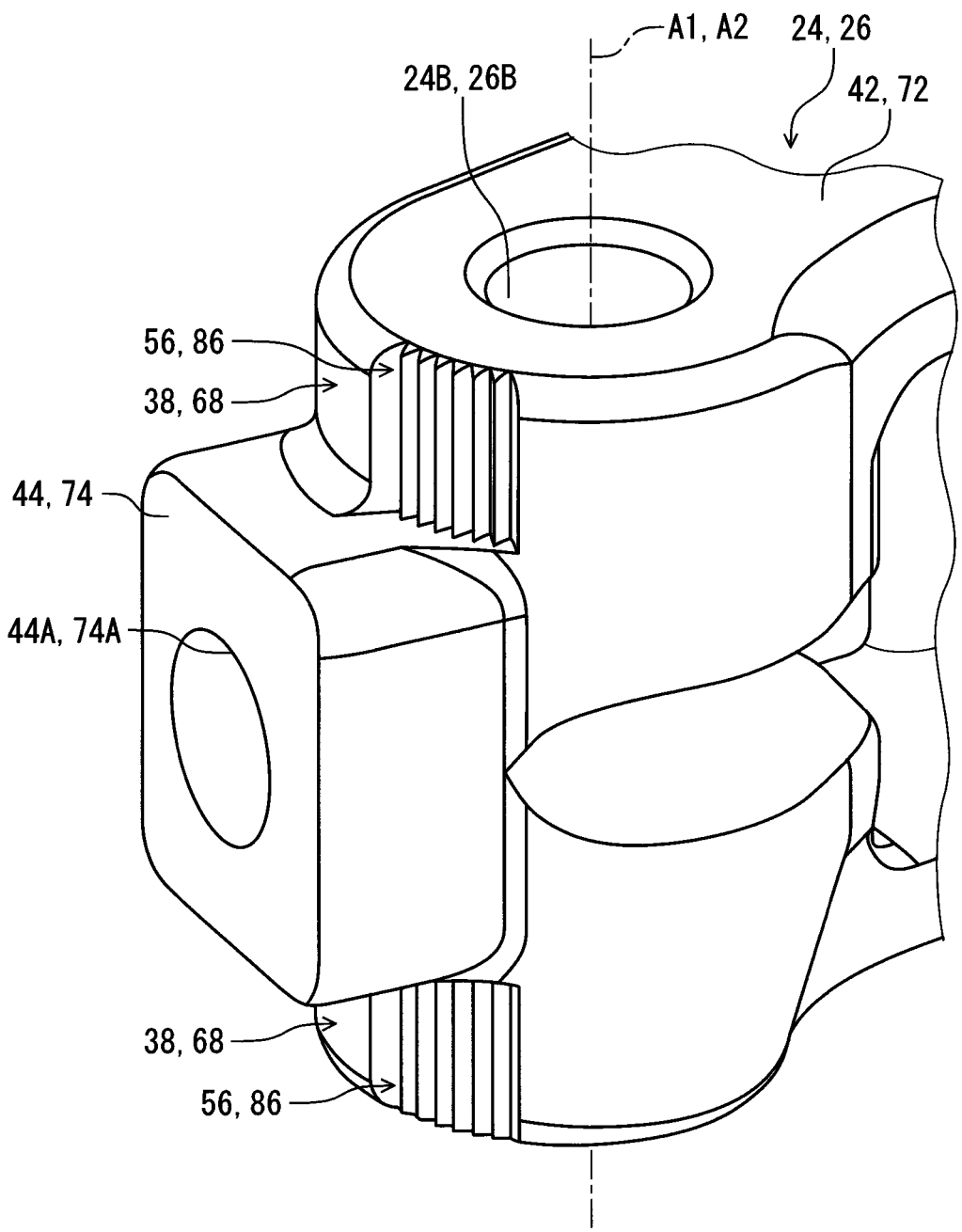
FIG. 9 is a perspective view of a first or second switch base member of the first or second switch unit of the operating device illustrated in FIG. 1.

As seen in FIG. 9, the first switch base member 24 includes a plurality of first guide surfaces 38. The first guide surfaces 38 are spaced apart from each other in the first direction D1. The first coupling structure 28 includes a plurality of first additional engagement parts 56. The first additional engagement parts 56 are spaced apart from each other in the first direction D1. A total number of the first guide surfaces 38 is not limited to the illustrated embodiment. A total number of the first additional engagement parts 56 is not limited to the illustrated embodiment.

As seen in FIG. 4, the second switch unit SW2 comprises a second switch 61. The second switch 61 is configured to be activated in response to a second user input U2. The second switch 61 is mounted to the second switch base member 26. The second switch base member 26 includes a second attachment recess 26A. The second switch 61 is provided in the second attachment recess 26A. In the present embodiment, the second switch 61 includes a push-button switch. However, the second switch 61 can include other types of switches.

The second switch unit SW2 comprises a second movable member 62. The second movable member 62 is pivotally coupled to the second switch base member 26 about the second pivot axis A2. The second movable member 62 is pivotable relative to the second switch base member 26 about the second pivot axis A2 in response to the second user input U2. The second movable member 62 is pivotally coupled to the second switch base member 26 about a second pivot axis A2 such that the second movable member 62 activates the second switch in response to the second user input U2.

Figure 10:
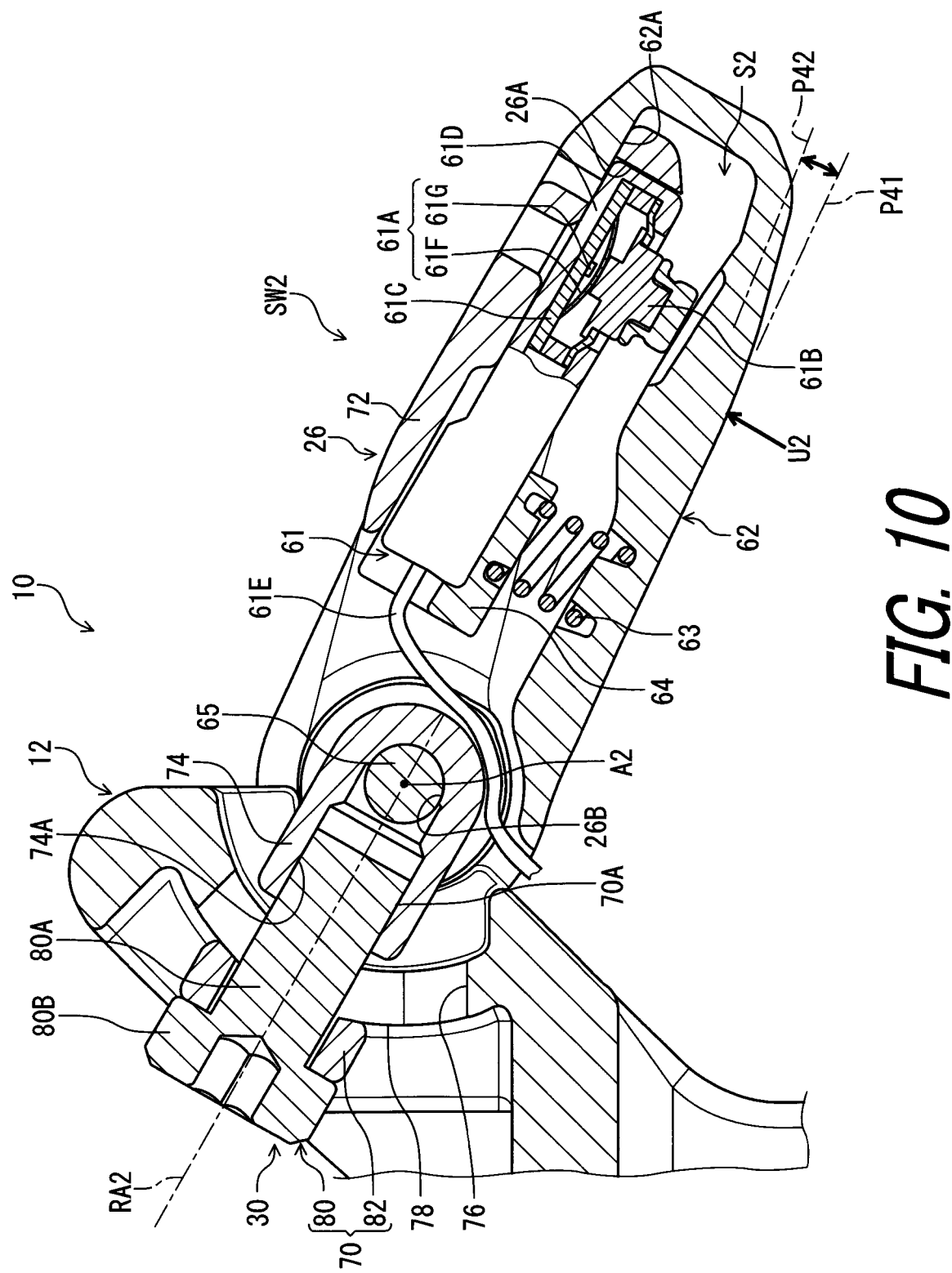
FIG. 10 is a cross-sectional view of a first switch unit of the operating device taken along line X-X of FIG. 14.

As seen in FIG. 10, the second switch 61 includes a switch circuit 61A, a button 61B, a base 61C, a casing 61D, and a wire 61E. The switch circuit 61A and the base 61C are provided in the casing 61D. The switch circuit 61A includes a movable contact 61F and a stationary contact 61G. The stationary contact 61G is provided on the base 61C. The movable contact 61F is elastically deformable and is provided on the base 61C. The movable contact 61F is contactable with the stationary contact 61G. The button 61B is movably attached to the base 61C. The button 61B is configured to transmit the second user input U2 to the movable contact 61F of the switch circuit 61A. The button 61B is movable relative to the base 61C in response to the second user input U2. The movable contact 61F and the stationary contact 61G are electrically connected with the wire 61E.

The movable contact 61F is not in contact with the stationary contact 61G in a state where the button 61B does not receive the second user input U2. The movable contact 61F is elastically deformed to come into contact with the stationary contact 61G when the button 61B transmits the second user input U2 to the movable contact 61F. Thus, the second user input U2 has an amount of force which is necessary to bring the movable contact 61F into contact with the stationary contact 61G to turn on the second switch 61.

The second switch 61 is provided between the second switch base member 26 and the second movable member 62. The second switch base member 26 and the second movable member 62 define a second space S2 between the second switch base member 26 and the second movable member 62. The second switch 61 is provided in the second space S2.

The second movable member 62 is movable relative to the second switch base member 26 about the second pivot axis A2 between a second rest position P41 and a second operated position P42. The second movable member 62 is pivoted about the second pivot axis A2 from the second rest position P41 toward the second operated position P42 in response to the second user input U2.

The second movable member 62 includes a second surface 62A. The second surface 62A is contactable with the second switch base member 26. The second surface 62A is in contact with the second switch base member 26 in a second rest state where the second movable member 62 is in the second rest position P41.

The second switch unit SW2 includes a second biasing member 63 and a second switch support 64. The second switch support 64 is attached to the second switch base member 26 to support the second switch 61. The second switch support 64 is provided in the second attachment recess 26A. The second switch 61 is provided between the second switch support 64 and the second switch base member 26. The second biasing member 63 is provided between the second switch support 64 and the second movable member 62 to bias the second movable member 62 toward the second rest position P41. The second surface 62A is pushed against the second switch base member 26 by a biasing force of the second biasing member 63 in the second rest state where the second movable member 62 is in the second rest position P41.

In the present embodiment, each of the second switch base member 26 and the second movable member 62 is made of a non-metallic material. The second switch base member 26 is made of a resin material such as synthetic resin. The second movable member 62 is made of a resin material such as synthetic resin. However, the second switch base member 26 and the second movable member 62 can be made of material other than the above materials.

The operating device 10 further comprises a second pin 65. The second pin 65 is configured to pivotally couple the second movable member 62 to the second switch base member 26 about the second pivot axis A2. The second pin 65 defines the second pivot axis A2. Thus, the second pin 65 can also be referred to as a second pivot pin 65.

As seen in FIG. 4, the second switch base member 26 includes a second hole 26B. As seen in FIGS. 2 and 4, the second movable member 62 includes second pivot holes 62B and 62C. The second pin 65 extends through the second hole 26B and the second pivot holes 62B and 62C.

Figure 11:
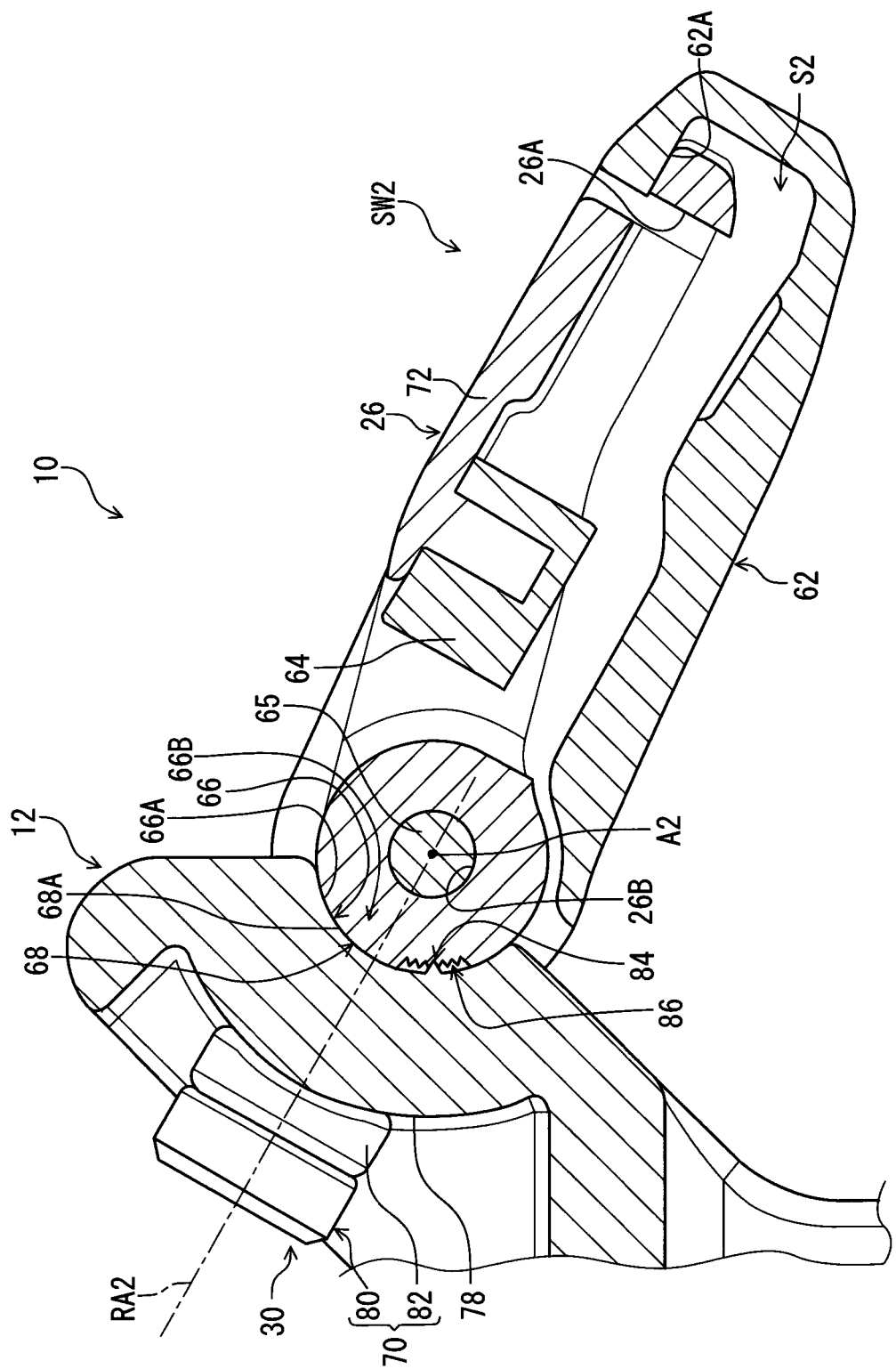
FIG. 11 is a cross-sectional view of the first switch unit of the operating device taken along line XI-XI of FIG. 14.

As seen in FIG. 11, the base structure 12 includes a second base guide surface 66. The second base guide surface 66 is configured to guide the second switch base member 26 relative to the base structure 12 about the second pivot axis A2 in a second adjustable state where the position of the second switch base member 26 is adjustable relative to the base structure 12 about the second pivot axis A2.

The second base guide surface 66 extends circumferentially about the second pivot axis A2. The second base guide surface 66 includes a second concave surface 66A. The second concave surface 66A defines a second recess 66B in which the second switch base member 26 is at least partially provided. In the present embodiment, the second switch base member 26 is partially provided in the second recess 66B. However, the second switch base member 26 can be entirely provided in the second recess 66B if needed and/or desired.

The second switch base member 26 includes a second guide surface 68. The second base guide surface 66 and the second guide surface 68 are configured to contact each other to guide the second switch base member 26 relative to the base structure 12 about the second pivot axis A2 in the second adjustable state. The second guide surface 68 extends circumferentially about the second pivot axis A2.

The second guide surface 68 includes a second convex surface 68A. The second convex surface 68A faces radially outwardly relative to the second pivot axis A2. The second concave surface 66A and the second convex surface 68A are configured to contact each other to guide the second switch base member 26 relative to the base structure 12 about the second pivot axis A2 in the second adjustable state.

As seen in FIG. 10, the second coupling structure 30 includes a second coupling member 70. The second coupling member 70 is configured to couple the second switch base member 26 to the base structure 12 to change a state of the second coupling structure 30 between a second lock state and the second adjustable state. In the second lock state, the second coupling structure 30 fastens the second switch base member 26 to the base structure 12 to restrict the second switch base member 26 from moving relative to the base structure 12. In the second adjustable state, the position of the second switch base member 26 is adjustable relative to the base structure 12 about the second pivot axis A2. For example, the second coupling structure 30 is in the second lock state if the second coupling member 70 is tightened. The second coupling structure 30 is in the second lock state if the second coupling member 70 is loosened.

The second switch base member 26 includes a second base body 72 and a second coupled member 74. The second coupled member 74 has a second threaded hole 74A. The second coupling member 70 includes second external threads 70A. The second external threads 70A are configured to be threadedly engaged with the second threaded hole 74A.

In the present embodiment, the second coupled member 74 is integrally provided with the second base body 72 as a one-piece unitary member. However, the second coupled member 74 can be a separate member from the second base body 72 if needed and/or desired.

The second coupling member 70 is rotatable relative to the second switch base member 26 about a second adjustment rotational axis RA2. The second adjustment rotational axis RA2 intersects with the second pivot axis A2.

The base structure 12 includes a second coupling opening 76. The second coupling member 70 extends through the second coupling opening 76. In the present embodiment, the second coupling opening 76 includes an elongated opening extending circumferentially about the second pivot axis A2. However, the second coupling opening 76 can have other shapes.

The base structure 12 includes a second receiving surface 78. The second coupling member 70 is contactable with the second receiving surface 78 in the second lock state. The second receiving surface 78 extends circumferentially about the second pivot axis A2. The second coupling member 70 includes a second screw 80 and a second washer 82. The second screw 80 includes the second external threads 70A. The second screw 80 includes a second screw body 80A and a second head 80B. The second screw body 80A includes the second external threads 70A. The second head 80B is provided at an end of the second screw body 80A. The second washer 82 is provided between the second head 80B and the second receiving surface 78. The second washer 82 is contactable with the second receiving surface 78. For example, the second coupling structure 30 is in the second lock state if the second screw 80 is tightened. The second coupling structure 30 is in the second lock state if the second screw 80 is loosened.

The second coupling member 70 is configured to pull the second switch base member 26 to fasten the second switch base member 26 to the base structure 12 in the second lock state. However, the second coupling member 70 can be configured to push the second switch base member 26 to fasten the second switch base member 26 to the base structure 12 in the second lock state if needed and/or desired.

As seen in FIG. 11, the second coupling structure 30 is configured to couple the second switch base member 26 to the base structure 12 such that the position of the second switch base member 26 is steplessly or stepwise adjustable relative to the base structure 12 about the second pivot axis A2. In the present embodiment, the second coupling structure 30 is configured to couple the second switch base member 26 to the base structure 12 such that the position of the second switch base member 26 is stepwisely adjustable relative to the base structure 12 about the second pivot axis A2. However, the second coupling structure 30 can be configured to couple the second switch base member 26 to the base structure 12 such that the position of the second switch base member 26 is steplessly adjustable relative to the base structure 12 about the second pivot axis A2 if needed and/or desired.

In the present embodiment, the second coupling structure 30 includes a second engagement part 84 and a second additional engagement part 86. The second engagement part 84 is provided to one of the base structure 12 and the second switch base member 26. The second additional engagement part 86 is provided to the other of the base structure 12 and the second switch base member 26. The second engagement part 84 and the second additional engagement part 86 are configured to engage with each other to position the second switch base member 26 relative to the base structure 12 about the second pivot axis A2 in the second lock state. In the present embodiment, the second engagement part 84 is provided to the base structure 12. The second additional engagement part 86 is provided to the second switch base member 26. However, the second engagement part 84 can be provided to the second switch base member 26 if needed and/or desired. The second additional engagement part 86 can be provided to the base structure 12 if needed and/or desired.

Figure 12:
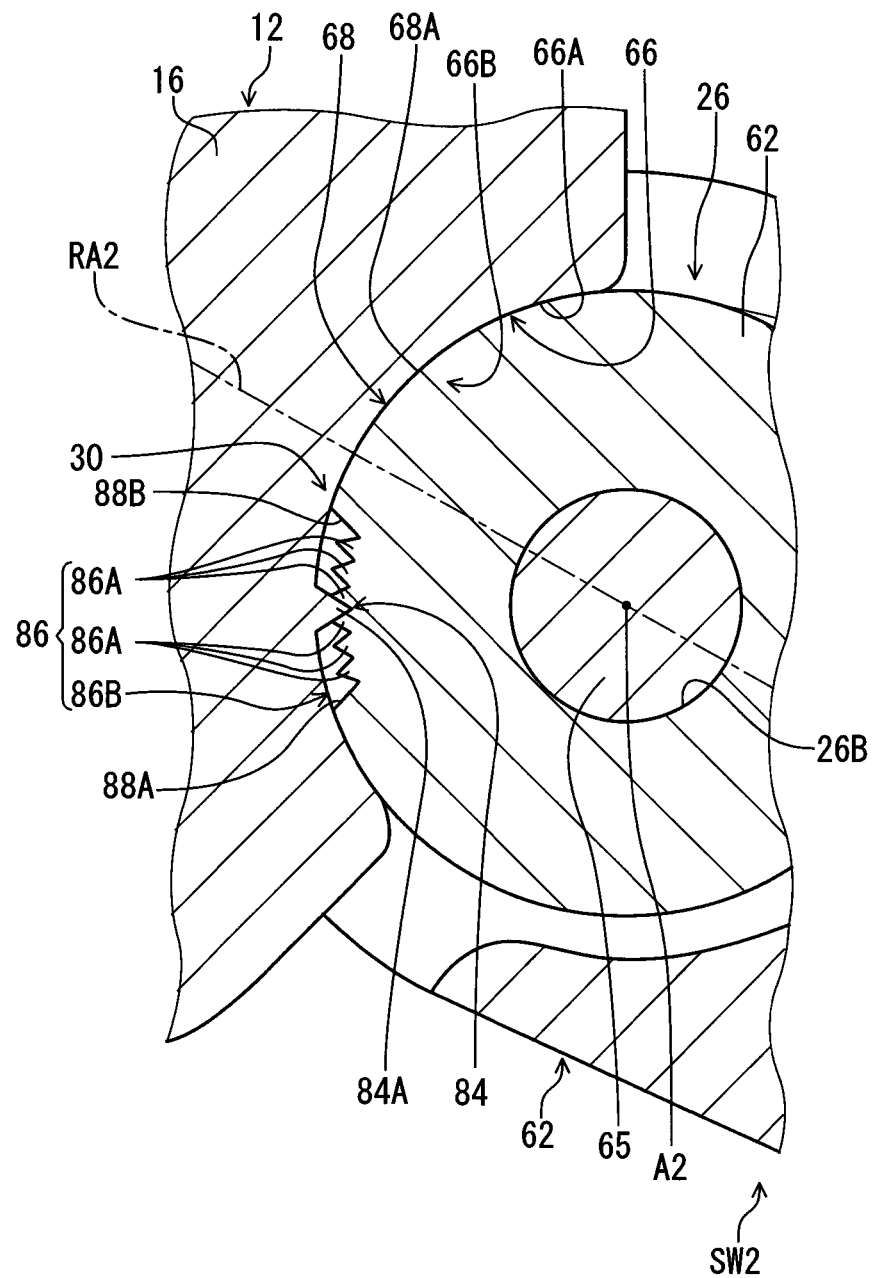
FIG. 12 is an enlarged partial cross-sectional view of the first switch unit of the operating device illustrated in FIG. 11.

As seen in FIG. 12, the second engagement part 84 includes a second projection 84A. The second projection 84A protrudes radially inwardly from the second base guide surface 66 with respect to the second pivot axis A2. The second additional engagement part 86 includes a plurality of second additional projections 86A and a second engagement recess 86B. The second engagement recess 86B is provided on the second guide surface 68. The plurality of second additional projections 86A is provided in the second engagement recess 86B. The second projection 84A is configured to be provided between adjacent two projections of the plurality of second additional projections 86A to position the second switch base member 26 relative to the base structure 12 about the second pivot axis A2 in the second lock state.

A tip of the second additional projection 86A is provided radially inwardly of the second guide surface 68 with respect to the second pivot axis A2. A radial length of the second additional projection 86A is shorter than a radial length of the second projection 84A. Thus, the second projection 84A is movable in the second engagement recess 86B without being fitted between adjacent two of the plurality of second additional projections 86A in the second adjustable state where the second coupling member 70 (e.g., the second screw 80) is loosened.

The structure of the second engagement part 84 is not limited to the above structure. The structure of the second additional engagement part 86 is not limited to the above structure. The second engagement part 84 and the second additional engagement part 86 can be omitted from the second coupling structure 30 if needed and/or desired. In a case where the second engagement part 84 and the second additional engagement part 86 can be omitted from the second coupling structure 30, the second coupling structure 30 is configured to couple the second switch base member 26 to the base structure 12 such that the position of the second switch base member 26 is steplessly adjustable relative to the base structure 12 about the second pivot axis A2.

The second coupling structure 30 includes a second stopper surface 88A and a second opposite stopper surface 88B. The second stopper surface 88A is spaced apart from the second opposite stopper surface 88B. The second stopper surface 88A is contactable with the second projection 84A of the second engagement part 84. The second opposite stopper surface 88B is contactable with the second projection 84A of the second engagement part 84. The plurality of second additional projections 86A of the second additional engagement part 86 is provided between the second stopper surface 88A and the second opposite stopper surface 88B. The second stopper surface 88A and the second opposite stopper surface 88B define the second engagement recess 86B.

The second stopper surface 88A defines the second end position P21 (see e.g., FIG. 3). The second switch unit SW2 and the second switch base member 26 are provided in the second end position P21 (see e.g., FIG. 3) in a state where the second projection 84A of the second engagement part 84 is in contact with the second stopper surface 88A.

The second opposite stopper surface 88B defines the second opposite end position P22 (see e.g., FIG. 3). The second switch unit SW2 and the second switch base member 26 are provided in the second opposite end position P22 (see e.g., FIG. 3) in a state where the second projection 84A of the second engagement part 84 is in contact with the second opposite stopper surface 88B.

As seen in FIG. 8, the base structure 12 includes a plurality of second base guide surfaces 66. The second base guide surfaces 66 are spaced from each other in a second direction D2 parallel to the second pivot axis A2. The second coupling structure 30 includes a plurality of second engagement parts 84. The second engagement parts 84 are spaced apart from each other in the second direction D2. A total number of the second base guide surfaces 66 is not limited to the illustrated embodiment. A total number of the second engagement parts 84 is not limited to the illustrated embodiment.

FIG. 9 can be utilized to describe the second switch base member 26 since the second switch base member 26 has a shape identical to a shape of the first switch base member 24. As seen in FIG. 9, the second switch base member 26 includes a plurality of second guide surfaces 68. The second guide surfaces 68 are spaced apart from each other in the second direction D2. The second coupling structure 30 includes a plurality of second additional engagement parts 86. The second additional engagement parts 86 are spaced apart from each other in the second direction D2. A total number of the second guide surfaces 68 is not limited to the illustrated embodiment. A total number of the second additional engagement parts 86 is not limited to the illustrated embodiment.

Figure 13:
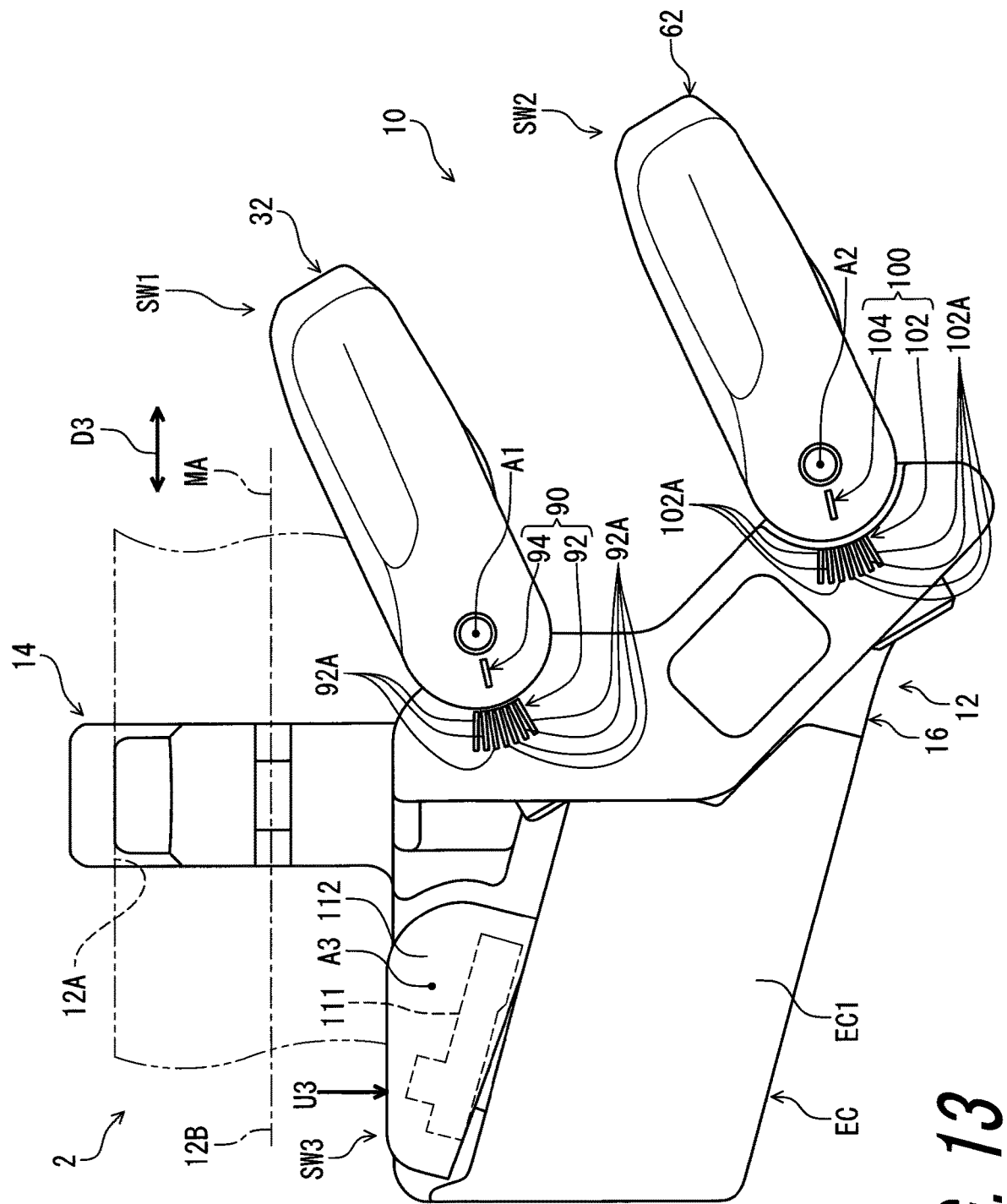
FIG. 13 is a bottom view of the operating device illustrated in FIG. 1.

As seen in FIG. 13, the operating device 10 further comprises a first position indicator 90. The first position indicator 90 is configured to indicate a position of the first switch unit SW1 relative to the base structure 12. The first position indicator 90 is provided to at least one of the base structure 12 and the first switch unit SW1.

In the present embodiment, the first position indicator 90 is provided to the base structure 12 and the first switch unit SW1. The first position indicator 90 includes a first base indicator 92 and a first indicator 94. The first base indicator 92 is provided to the base structure 12. The first indicator 94 is provided to the first switch unit SW1. The first indicator 94 is provided to the first movable member 32. The first position indicator 90 is configured to indicate the position of the first switch unit SW1 relative to the base structure 12 using a relative position between the first base indicator 92 and the first indicator 94. The first base indicator 92 includes a plurality of indicators 92A circumferentially spaced apart from each other about the first pivot axis A1. The first position indicator 90 is configured to indicate the position of the first switch unit SW1 relative to the base structure 12 using a positional relationship between the first indicator 94 and the plurality of indicators 92A. However, the first indicator 94 can include a plurality of indicators if needed and/or desired. The structure of the first position indicator 90 is not limited to the first base indicator 92 and the first indicator 94.

In the present embodiment, the second position indicator 100 is provided to the base structure 12 and the second switch unit SW2. The second position indicator 100 includes a second base indicator 102 and a second indicator 104. The second base indicator 102 is provided to the base structure 12. The second indicator 104 is provided to the second switch unit SW2. The second indicator 104 is provided to the second movable member 62. The second position indicator 100 is configured to indicate the position of the second switch unit SW2 relative to the base structure 12 using a relative position between the second base indicator 102 and the second indicator 104. The second base indicator 102 includes a plurality of indicators 102A circumferentially spaced apart from each other about the second pivot axis A2. The second position indicator 100 is configured to indicate the position of the second switch unit SW2 relative to the base structure 12 using a positional relationship between the second indicator 104 and the plurality of indicators 102A. However, the second indicator 104 can include a plurality of indicators if needed and/or desired. The structure of the second position indicator 100 is not limited to the second base indicator 102 and the second indicator 104.

Figure 14:
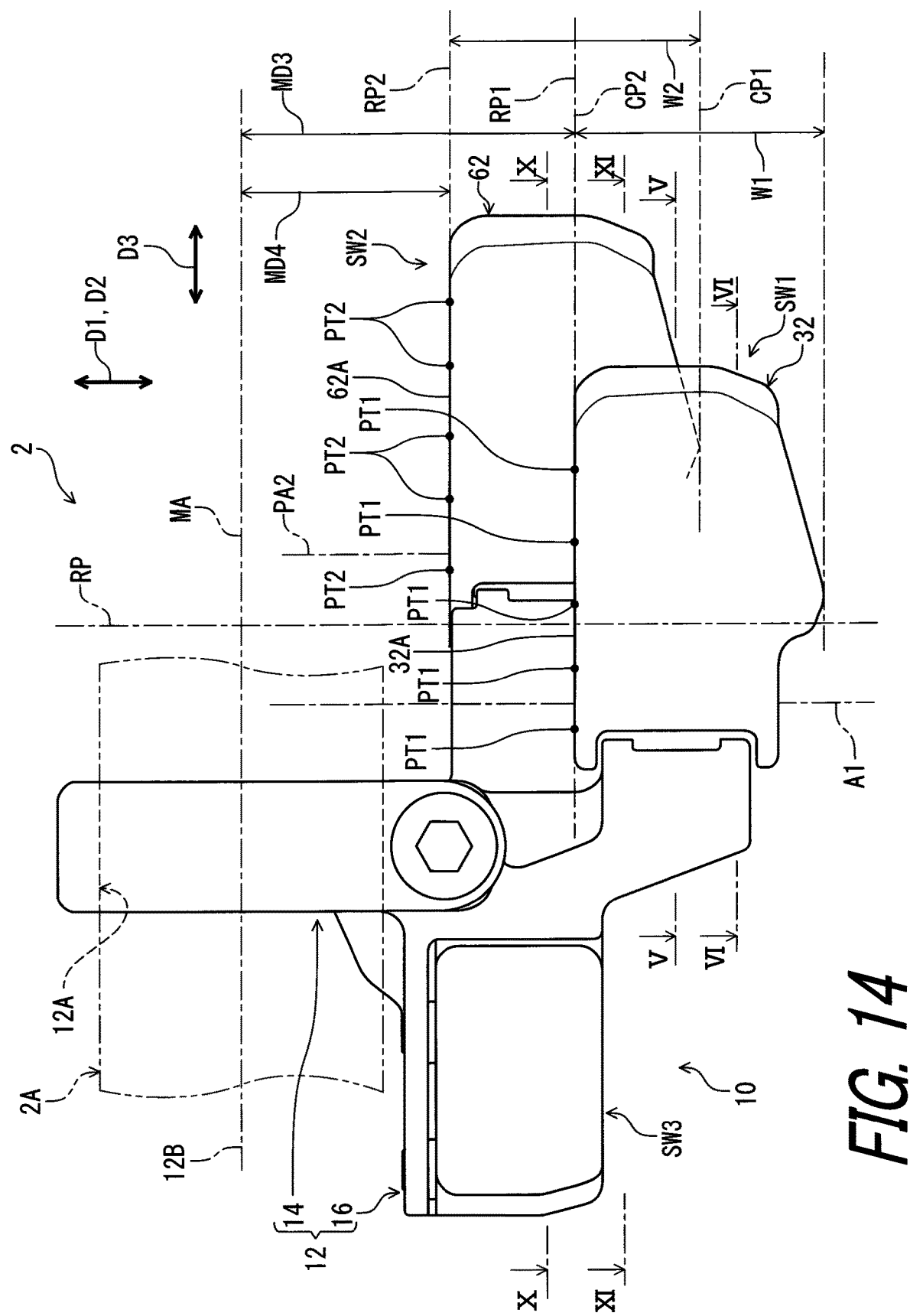
FIG. 14 is a side-elevational view of the operating device illustrated in FIG. 1.

As seen in FIG. 14, the first pivot axis A1 is non-parallel to the mounting axis MA. The first pivot axis A1 extends along a reference plane RP non-parallel to the mounting axis MA. The first pivot axis A1 extends along the reference plane RP perpendicular to the mounting axis MA. The second pivot axis A2 is non-parallel to the mounting axis MA. The second pivot axis A2 extends along the reference plane RP. In the present embodiment, the reference plane RP is perpendicular to the mounting axis MA. However, the reference plane RP can be non-perpendicular to the mounting axis MA if needed and/or desired. The reference plane RP can be defined in a position other than the position illustrated in FIG. 14.

Figure 15:
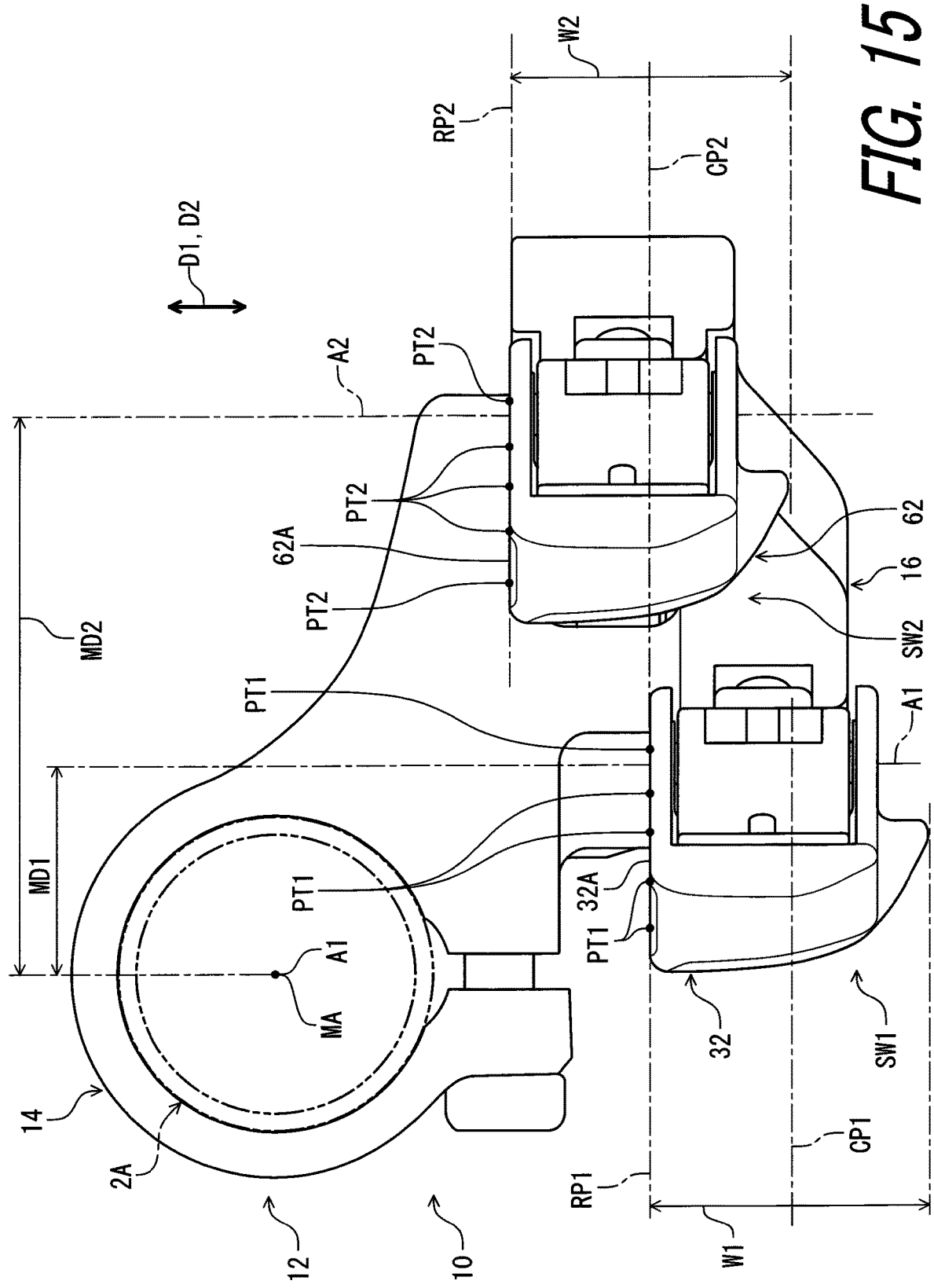
FIG. 15 is a side-elevational view of the operating device illustrated in FIG. 1.

As seen in FIG. 15, the second pivot axis A2 extends along the first pivot axis A1 as viewed along the mounting axis MA. The second pivot axis A2 is parallel to the first pivot axis A1 as viewed along the mounting axis MA. However, the second pivot axis A2 can be non-parallel to the first pivot axis A1 as viewed along the mounting axis MA if needed and/or desired.

As seen in FIG. 14, the second pivot axis A2 is offset from the first pivot axis A1 in a mounting axis direction D3 parallel to the mounting axis MA. The first pivot axis A1 is closer to the mounting opening 12A than the second pivot axis A2 in the mounting axis direction D3.

As seen in FIGS. 14 and 15, the second pivot axis A2 is non-perpendicular to the first pivot axis A1. In the present embodiment, the second pivot axis A2 is parallel to the first pivot axis A1. However, the second pivot axis A2 can be non-parallel to the first pivot axis A1 if needed and/or desired.

As seen in FIG. 1, the first movable member 32 includes a first surface 32A. The second movable member 62 includes a second surface 62A. As seen in FIGS. 14 and 15, the first surface 32A is non-parallel to the first pivot axis A1. The second surface 62A is non-parallel to the second pivot axis A2. In the present embodiment, the first surface 32A is perpendicular to the first pivot axis A1. The second surface 62A is perpendicular to the second pivot axis A2. However, the first surface 32A can be non-perpendicular to the first pivot axis A1 if needed and/or desired. The second surface 62A can be non-perpendicular to the second pivot axis A2 if needed and/or desired.

As seen in FIG. 14, the first switch unit SW1 comprises a first point PT1. The first point PT1 is closest to the mounting axis MA along the first direction D1 parallel to the first pivot axis A1. In the present embodiment, the first switch unit SW1 comprises a plurality of first points PT1 which are closest to the mounting axis MA along the first direction D1. The plurality of first points PT1 is provided on the first surface 32A since the first surface 32A is perpendicular to the first pivot axis A1. However, the first switch unit SW1 can comprise only one first point PT1 depending on the shape of the first switch unit SW1. The positions of the first points PT1 are not limited to the positions illustrated in FIG. 14. The position of the first point PT1 can vary depending on at least one of the shape of the first switch unit SW1 and the posture of the first switch unit SW1.

The second switch unit SW2 comprises a second point PT2. The second point PT2 is closest to the mounting axis MA along the second direction D2 parallel to the second pivot axis A2. In the present embodiment, the second switch unit 20 comprises a plurality of second points PT2 which are closest to the mounting axis MA along the second direction D2. The plurality of second points PT2 is provided on the second surface 62A since the second surface 62A is perpendicular to the second pivot axis A2. However, the second switch unit 20 can comprise only one second point PT2 depending on the shape of the second switch unit 20. The positions of the second points PT2 are not limited to the positions illustrated in FIG. 14. The position of the second point PT2 can vary depending on at least one of the shape of the second switch unit SW2 and the posture of the second switch unit SW2.

As seen in FIG. 15, a first minimum distance MD1 is defined between the first pivot axis A1 and the mounting axis MA as viewed along the mounting axis MA. A second minimum distance MD2 is defined between the second pivot axis A2 and the mounting axis MA as viewed along the mounting axis MA. The second minimum distance MD2 is longer than the first minimum distance MD1. However, the second minimum distance MD2 can be shorter than or equal to the first minimum distance MD1 if needed and/or desired.

As seen in FIG. 14, a third minimum distance MD3 is defined between a first reference plane RP1 and the mounting axis MA as viewed along the mounting axis MA. The first reference plane RP1 is perpendicular to the first pivot axis A1 and includes the first point PT1. The plurality of first points PT1 are provided on the first reference plane RP1.

A fourth minimum distance MD4 is defined between a second reference plane RP2 and the mounting axis MA as viewed along the mounting axis MA. The second reference plane RP2 is perpendicular to the second pivot axis A2 and includes the second point PT2. In the present embodiment, the third minimum distance MD3 is longer than the fourth minimum distance MD4. However, the third minimum distance MD3 can be shorter than or equal to the fourth minimum distance MD4 if needed and/or desired.

As seen in FIG. 14, the first switch unit SW1 has a first width W1 and a first center plane CP1. The first width W1 is defined along the first pivot axis A1. The first width W1 is defined in the first direction D1 parallel to the first pivot axis A1. The first center plane CP1 is defined to bisect the first width W1 and is perpendicular to the first pivot axis A1.

The second switch unit SW2 has a second width W2 and a second center plane CP2. The second width W2 is defined along the second pivot axis A2. The second width W2 is defined in the second direction D2 parallel to the second pivot axis A2. The second center plane CP2 is defined to bisect the second width W2 and is perpendicular to the second pivot axis A2.

In the present embodiment, the second center plane CP2 is offset from the first center plane CP1. The second center plane CP2 is provided between the first center plane CP1 and the mounting axis MA. The second center plane CP2 is coincident with the first reference plane RP1. However, the second center plane CP2 can be offset from the first reference plane RP1 if needed and/or desired. The second center plane CP2 can be coincident with the first center plane CP1 if needed and/or desired. The first center plane CP1 can be provided between the second center plane CP2 and the mounting axis MA if needed and/or desired.

As seen in FIG. 13, the operating device 10 further comprises a third switch unit SW3. The third switch unit SW3 is configured to be activated in response to a third user input U3. The third switch unit SW3 is mounted to the base structure 12 in a position different from a position of the first switch unit SW1 and a position of the second switch unit SW2.

The third switch unit SW3 includes a third switch 111 and a third movable member 112. The third movable member 112 is movably coupled to the base structure 12. The third switch 111 is configured to be activated in response to the third user input U3. The third movable member 112 is pivotally coupled to the base structure 12 about a third pivot axis A3. The third movable member 112 is pivotable relative to the base structure 12 about the third pivot axis A3 in response to the first user input U1. The third movable member 112 is pivotally coupled to the base structure 12 about the third pivot axis A3 such that the third movable member 112 activates the third switch 111 in response to the third user input U3.

The operating device 10 includes an electrical component EC. The electrical component EC is coupled to the base structure 12. The electrical component EC is detachably coupled to the base structure 12. The electrical component EC includes a housing EC1. The housing EC1 is detachably coupled to the base structure 12 with fasteners EC2 (see e.g., FIG. 3) such as screws. However, the electrical component EC can be non-detachably coupled to the base structure 12 or the housing EC1 can be integrally provided with the base structure 12 as a one-piece unitary member if needed and/or desired.

Figure 16:
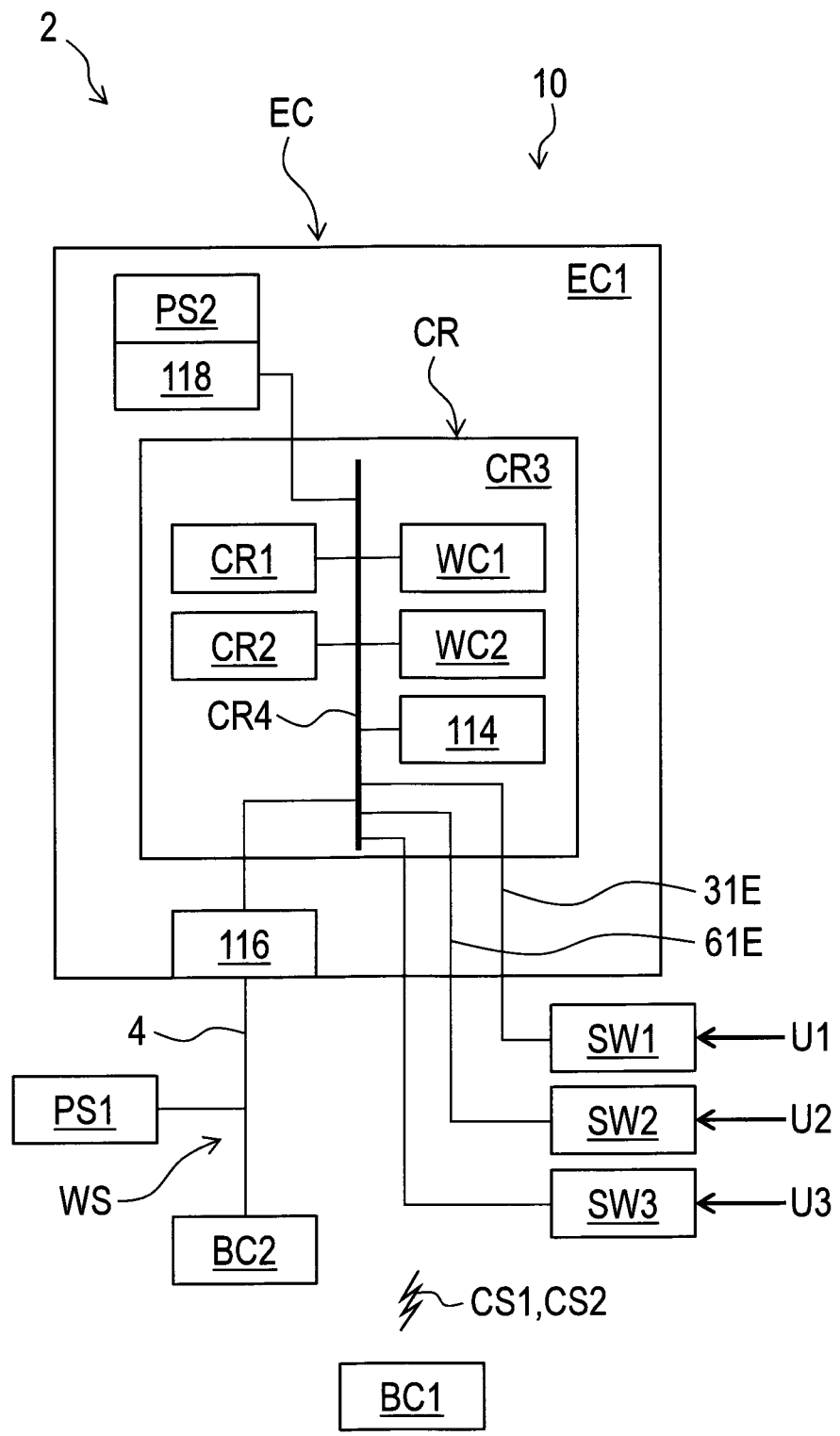
FIG. 16 is a schematic block diagram of the human-powered vehicle illustrated in FIG. 1.

As seen in FIG. 16, the electrical component EC includes a controller CR, a wireless communicator WC1, a wired communicator WC2, an informing unit 114, a connection port 116, and a power-source holder 118. The controller CR is electrically connected to the wireless communicator WC1, the wired communicator WC2, the informing unit 114, the connection port 116, the power-source holder 118, the first switch unit SW1, the second switch unit SW2, and the third switch unit SW3.

In the present embodiments, the electrical component EC includes the wireless communicator WC1 and the wired communicator WC2. However, one of the wireless communicator WC1 and the wired communicator WC2 can be omitted from the electrical component EC if needed and/or desired.

The controller CR includes a hardware processor CR1, a hardware memory CR2, a circuit board CR3, and a system bus CR4. The hardware processor CR1 and the hardware memory CR2 are electrically mounted on the circuit board CR3. For example, the hardware processor CR1 includes a central processing unit (CPU) and a memory controller. The hardware processor CR1 is electrically connected to the hardware memory CR2 with the circuit board CR3 and the system bus CR4. Each of the wireless communicator WC1 and the wired communicator WC2 is electrically connected to the hardware processor CR1 and the hardware memory CR2 with the circuit board CR3 and the system bus CR4.

The hardware memory CR2 includes a read only memory (ROM) and a random-access memory (RAM). The hardware memory CR2 includes storage areas each having an address in the ROM and the RAM. The hardware processor CR1 is configured to control the hardware memory CR2 to store data in the storage areas of the hardware memory CR2 and reads data from the storage areas of the hardware memory CR2. The hardware memory CR2 (e.g., the ROM) stores a program. The program is read into the hardware processor CR1, and thereby the configuration and/or algorithm of the controller CR is performed. The structure and/or configuration are not limited to the above structure and/or configuration. The controller CR can also be referred to as a control circuit or circuitry CR. The hardware processor CR1 can also be referred to as a hardware processor circuit or circuitry CR1. The hardware memory CR2 can also be referred to as a hardware memory circuit or circuitry CR2.

The wireless communicator WC1, the wired communicator WC2, and the informing unit 114 are electrically mounted on the circuit board CR3. The connection port 116 is configured to be detachably connected to an electric cable. The wireless communicator WC1, the wired communicator WC2, and the informing unit 114 are electrically to the hardware processor CR1 and the hardware memory CR2 via the circuit board CR3 and the system bus CR4. The connection port 116, the power-source holder 118, the first switch unit SW1, and the second switch unit SW2 are electrically connected to the system bus CR4. The connection port 116, the power-source holder 118, the first switch unit SW1, and the second switch unit SW2 are electrically connected to the hardware processor CR1 and the hardware memory CR2 via the circuit board CR3 and the system bus CR4.

The wireless communicator WC1 is configured to communicate with another wireless communicator via a wireless communication channel. The wired communicator WC2 is configured to communicate with another wired communicator via a wired communication channel. In the present embodiment, the wireless communicator WC1 is configured to communicate with a wireless communicator of the electric device BC1 via a wireless communication channel. The wired communicator WC2 is configured to communicate with the wired communicator of the electric device BC2 via the wired communication channel. The wireless communicator WC1 can also be referred to as a wireless communication circuit or circuitry WC1. The wired communicator WC2 can also be referred to as a wired communication circuit or circuitry WC2.

The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. In the present embodiment, the wireless communicator WC1 is configured to encrypt signals using a cryptographic key to generate encrypted wireless signals.

The wireless communicator WC1 is configured to receive wireless signals via the antenna. In the present embodiment, the wireless communicator WC1 is configured to decode the wireless signals to recognize signals transmitted from other wireless communicators of the electric device BC1 and/or BC2. The wireless communicator WC1 is configured to decrypt the wireless signals using the cryptographic key.

The controller CR is configured to control another device in response to the first user input U1, the second user input U2, and/or other information. In the present embodiment, the controller CR is configured to control the wireless communicator WC1 to transmit a control signal CS1 and/or CS2 to the electric device BC1. In a case where the electric device BC2 includes an operated device, the controller CR is configured to control the wireless communicator WC1 and the wired communicator WC2 to transmit the control signal CS1 and/or CS2 to the electric device BC1 and/or BC2. In a case where the electric device BC2 includes a satellite operating device, the controller CR is configured to control the wired communicator WC2 to receive a signal from the electric device BC2 and is configured to control the wireless communicator WC1 to transmit a control signal to the electric device BC1 or another electric device. In the present embodiment, the first user input U1 and the control signal CS1 indicate upshifting of the electric device BC1. The second user input U2 and the control signal CS2 indicate downshifting of the electric device BC1. However, the first and second user inputs U1 and U2 and the control signals CS1 and CS2 can be used to operate other devices.

The controller CR is configured to detect connection between the connection port 116 and an electric cable of a wired communication structure WS. The controller CR is configured to control the wired communicator WC2 to communicate with the electric device BC2 if the controller CR detects the connection between the connection port 116 and the electric cable 4 connected to the electric device BC2. In a case where the electric device BC2 includes an additional operating device such as a satellite operating device (e.g., a satellite switch), the controller CR is configured to control another component such as the electric device BC1 based on a control signal transmitted from the electric device BC2 or other components via the electric cable 4 and the connection port 116. In a case where the electric device BC2 includes an operated component, the controller CR is configured to transmit a control signal to the operated component via the connection port 116 and the electric cable 4.

The wired communication structure WS is electrically connected to a shared power source PS1 such as a battery. The shared power source PS1 is configured to supply electricity to the electrical component EC via the wired communication structure WS and the connection port 116 in a state where the electric cable 4 of the wired communication structure WS is connected to the connection port 116. The controller CR, the wireless communicator WC1, the wired communicator WC2, and the informing unit 114 are powered by the shared power source PS1 if the shared power source PS1 supplies electricity to the electrical component EC via the wired communication structure WS and the connection port 116.

In the present embodiment, the wired communicator WC2 is configured to communicate with other wired communicators using power line communication (PLC) technology. The PLC technology is used for communicating between electric devices. The PLC carries data on a conductor that is also used simultaneously for electric power transmission or electric power distribution to the electric devices. However, the wired communicator WC2 can be configured to communicate with other wired communicators without the PLC.

The controller CR is configured to update firmware stored in the hardware memory CR2 via the connection port 116 in a case where a device configured to update firmware is electrically connected to the connection port 116.

The power-source holder 118 is configured to hold an electric power source PS2 such as a battery. The power-source holder 118 is configured to removably hold the electric power source PS2. The electric power source PS2 is configured to supply electricity to the controller CR, the wireless communicator WC1, the wired communicator WC2, the informing unit 114 via the power-source holder 118 in a case where the shared power source PS1 is not electrically connected to the electrical component EC via the wired communication structure WS and the connection port 116.

The informing unit 114 is configured to inform the user of a state of the operating device 10. Examples of the state of the operating device 10 includes a communication state of the wireless communicator WC1, a communication state of the wired communicator WC2, a level of remaining electricity of the shared power source PS1, a level of remaining electricity of the electric power source PS2, and a pairing state of the wireless communicator WC1. Examples of the informing unit 114 include a light emitting device such as a light-emitting diode (LED) and a loudspeaker. In the present embodiment, the informing unit 114 includes a light transmitting member (e.g., a transparent member) configured to transmit light from the LED to an outside of the housing EC1. The LED of the informing unit 114 is electrically mounted on the circuit board CR3. The light transmitting member of the informing unit 114 is provided to the housing EC1. The light transmitting member of the informing unit 114 is provided to a lower surface of the housing EC1. However, the informing unit 114 can be provided other portions of the operating device 10 if needed and/or desired. For example, the light transmitting member of the informing unit 114 can be provided on at least one of an upper surface, a lower surface, a front surface, a rear surface, a left surface, and a right surface of the operating device 10 if needed and/or desired. The informing unit 114 can be omitted from the operating device 10 if needed and/or desired.

As seen in FIGS. 2 to 14, the second switch base member 26 has a shape identical to a shape of the first switch base member 24. The second switch 61 has a shape identical to a shape of the first switch 31. The second switch unit SW2 has a shape identical to a shape of the first switch unit SW1. However, the second switch unit SW2 can have a shape different from a shape of the first switch unit SW1 if needed and/or desired. The second switch 61 can have a shape different from a shape of the first switch 31 if needed and/or desired. The second switch base member 26 can have a shape different from a shape of the first switch base member 24 if needed and/or desired.

In the above embodiments and the modifications, as seen in FIG. 5, the first base body 42 is integrally provided with the first coupled member 44 as a one-piece unitary member. However, the first base body 42 can be a separate member from the first coupled member 44 if needed and/or desired. For example, the first base body 42 can be movably coupled to the first coupled member 44. In such an embodiment, the first base body 42 is pivotally coupled to the first coupled member 44 about the first pivot axis A1 between a base rest position and a base operated position. The first guide surface 38 and the plurality of first additional engagement parts 56 are provided on the first coupled member 44. The first coupling structure 28 can include a base biasing member configured to bias the first base body 42 relative to the first coupled member 44 toward the base rest position. The biasing force of the base biasing member is less than the biasing force of the first biasing member 33. The first base body 42 is pivoted relative to the first coupled member 44 in response to the first user input U1 without activating the first switch 31. The first switch 31 is activated when the first base body 42 reaches the base operated position and the first movable member 32 is moved to press the first switch 31 in response to the first user input U1. The same modification can be applied to the second switch unit SW2.

In the above embodiments and the modifications, as seen in FIG. 7, the first coupling structure 28 is configured to couple the first switch base member 24 to the base structure 12 such that the position of the first switch base member 24 is stepwisely adjustable relative to the base structure 12 about the first pivot axis A1. However, the first coupling structure 28 can be configured to couple the first switch base member 24 to the base structure 12 such that the position of the first switch base member 24 is steplessly adjustable relative to the base structure 12 about the first pivot axis A1 if needed and/or desired. In such an embodiment, for example, the plurality of first additional projections 56A illustrated in FIG. 7 can be omitted from the first coupling structure 28 to enable the position of the first switch base member 24 to be steplessly adjustable relative to the base structure 12 about the first pivot axis A1. Furthermore, the first projection 54A and the first engagement recess 56B can be omitted from the first coupling structure 28 to enable the position of the first switch base member 24 to be steplessly adjustable relative to the base structure 12 about the first pivot axis A1. The same modifications can be applied to the second coupling structure 30 illustrated in FIG. 12.

In the above embodiments and the modifications, as seen in FIG. 6, the base structure 12 includes the first base guide surface 36, and the first switch base member 24 includes the first guide surface 38. However, the first base guide surface 36 and the first guide surface 38 can be omitted from the base structure 12 and the first switch base member 24 if needed and/or desired. In such an embodiment, the first pin 35 can pivotally couple the first switch base member 24 to the base structure 12 about the first pivot axis A1. The same modification can be applied to the second switch base member 26.

In the present application, the term "comprising" and its derivatives, as used herein, are intended to be open ended teams that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the team "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human-powered vehicle, comprising:
    a base structure defining a mounting axis and configured to be mounted to a tubular part of the human-powered vehicle;
    a first switch unit comprising:
        a first switch base member configured to be pivotally coupled to the base structure about a first pivot axis; and
        a first switch mounted to the first switch base member, the first switch unit having a first point thereon that is closest, of an entirety of the first switch unit, to the mounting axis along a first direction parallel to the first pivot axis; and
    a second switch unit comprising:
        a second switch base member configured to be pivotally coupled to the base structure about a second pivot axis;
        a second switch mounted to the second switch base member,
        the second switch unit having a second point thereon that is closest, of an entirety of the second switch unit, to the mounting axis along a second direction parallel to the second pivot axis,
    a first minimum distance being defined as a shortest distance between the first pivot axis and the mounting axis as viewed along the mounting axis,
    a second minimum distance being defined as a shortest distance between the second pivot axis and the mounting axis as viewed along the mounting axis, the second minimum distance being longer than the first minimum distance,
    a third minimum distance being defined as a shortest distance between a first reference plane and the mounting axis as viewed along the mounting axis, the first reference plane being parallel to the mounting axis and including the first point,
    a fourth minimum distance being defined as a shortest distance between a second reference plane and the mounting axis as viewed along the mounting axis, the second reference plane being parallel to the mounting axis and including the second point, the third minimum distance being longer than the fourth minimum distance.

2. The operating device according to claim 1, wherein the second pivot axis is parallel to the first pivot axis as viewed along the mounting axis.

3. The operating device according to claim 1, further comprising
    a first coupling structure configured to couple the first switch base member to the base structure such that the position of the first switch base member is adjustable relative to the base structure about the first pivot axis; and
    a second coupling structure configured to couple the second switch base member to the base structure such that the position of the second switch base member is adjustable relative to the base structure about the second pivot axis.

4. The operating device according to claim 3, wherein the first coupling structure is configured to couple the first switch base member to the base structure such that the position of the first switch base member is stepwisely adjustable relative to the base structure about the first pivot axis.

5. The operating device according to claim 4, wherein the second coupling structure is configured to couple the second switch base member to the base structure such that the position of the second switch base member is stepwisely adjustable relative to the base structure about the second pivot axis.

6. The operating device according to claim 1, wherein the first switch unit has
    a first width defined along the first pivot axis, and
    a first center plane defined to bisect the first width and perpendicular to the first pivot axis,
the second switch unit has
    a second width defined along the second pivot axis, and
    a second center plane defined to bisect the second width and perpendicular to the second pivot axis, and
the second center plane is offset from the first center plane.

7. The operating device according to claim 6, wherein the second center plane is provided between the first center plane and the mounting axis.

8. The operating device according to claim 1, wherein the second pivot axis is offset from the first pivot axis in a mounting axis direction parallel to the mounting axis.

9. The operating device according to claim 8, wherein the base structure includes a mounting opening through which the tubular part is to extend in a mounting state where the base structure is mounted to the tubular part, and
the first pivot axis is closer to the mounting opening than the second pivot axis in the mounting axis direction.

10. The operating device according to claim 1, wherein the first pivot axis is non-parallel to the mounting axis, and
the second pivot axis is non-parallel to the mounting axis.

11. The operating device according to claim 10, wherein the first pivot axis extends along a reference plane perpendicular to the mounting axis, and
the second pivot axis extends along the reference plane.

12. The operating device according to claim 1, wherein the second switch base member has a shape identical to a shape of the first switch base member.

13. The operating device according to claim 1, wherein the second switch has a shape identical to a shape of the first switch.

14. The operating device according to claim 1, wherein the second switch unit has a shape identical to a shape of the first switch unit.

15. The operating device according to claim 1, wherein the first switch unit includes a first movable member, and the first movable member is pivotally coupled to the first switch base member about the first pivot axis, the first movable member being pivotable relative to the first switch base member about the first pivot axis in response to the first user input.

16. The operating device according to claim 1, wherein the second switch unit includes a second movable member, and the second movable member is pivotally coupled to the second switch base member about the second pivot axis, the second movable member being pivotable relative to the second switch base member about the second pivot axis in response to the second user input.

17. The operating device according to claim 1, wherein the first switch unit, the second switch unit, and the third switch unit are electrically connected to a control circuit.

18. An operating device for a human-powered vehicle, comprising:
a base structure defining a mounting axis and configured to be mounted to a tubular part of the human-powered vehicle;
a first switch unit comprising:
a first switch base member configured to be pivotally coupled to the base structure about a first pivot axis; and
a first switch mounted to the first switch base member, the first switch unit having a first point thereon that is closest, of an entirety of the first switch unit, to the mounting axis along a first direction parallel to the first pivot axis; and
a second switch unit comprising:
a second switch base member configured to be pivotally coupled to the base structure about a second pivot axis;
a second switch mounted to the second switch base member,
the second switch unit having a second point thereon that is closest, of an entirety of the second switch unit, to the mounting axis along a second direction parallel to the second pivot axis,
a first minimum distance being defined as a shortest distance between the first pivot axis and the mounting axis as viewed along the mounting axis,
a second minimum distance being defined as a shortest distance between the second pivot axis and the mounting axis as viewed along the mounting axis, the second minimum distance being longer than the first minimum distance, wherein
the second pivot axis is parallel to the first pivot axis as viewed along the mounting axis.

19. The operating device according to claim 18, wherein
a third minimum distance being defined as a shortest distance between a first reference plane and the mounting axis as viewed along the mounting axis, the first reference plane being parallel to the mounting axis and including the first point,
a fourth minimum distance being defined as a shortest distance between a second reference plane and the mounting axis as viewed along the mounting axis, the second reference plane being parallel to the mounting axis and including the second point, the third minimum distance being longer than the fourth minimum distance.

20. An operating device for a human-powered vehicle, comprising:
a base structure defining a mounting axis and configured to be mounted to a tubular part of the human-powered vehicle;
a first switch unit comprising:
a first switch base member configured to be pivotally coupled to the base structure about a first pivot axis; and
a first switch mounted to the first switch base member,
the first switch unit having a first point thereon that is closest, of an entirety of the first switch unit, to the mounting axis along a first direction parallel to the first pivot axis;
a second switch unit comprising:
a second switch base member configured to be pivotally coupled to the base structure about a second pivot axis;
a second switch mounted to the second switch base member,
the second switch unit having a second point thereon that is closest, of an entirety of the second switch unit, to the mounting axis along a second direction parallel to the second pivot axis; and
a third switch unit configured to be activated in response to a third user input, wherein
a first minimum distance being defined as a shortest distance between the first pivot axis and the mounting axis as viewed along the mounting axis,
a second minimum distance being defined as a shortest distance between the second pivot axis and the mounting axis as viewed along the mounting axis, the second minimum distance being longer than the first minimum distance, and
the third switch unit is mounted to the base structure in a position different from a position of the first switch unit and a position of the second switch unit.

* * * * *